United States Patent
Li et al.

(10) Patent No.: US 12,443,809 B2
(45) Date of Patent: Oct. 14, 2025

(54) POSITIONING METHOD, APPARATUS, AND SYSTEM

(71) Applicant: HUAWEI TECHNOLOGIES CO., LTD., Guangdong (CN)

(72) Inventors: Yuan Li, Shenzhen (CN); Renhui Sun, Dongguan (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 18/590,467

(22) Filed: Feb. 28, 2024

(65) Prior Publication Data
US 2024/0202474 A1 Jun. 20, 2024

Related U.S. Application Data

(63) Continuation of application No. PCT/CN2022/115959, filed on Aug. 30, 2022.

(30) Foreign Application Priority Data

Aug. 31, 2021 (CN) .......................... 202111015824.2

(51) Int. Cl.
G06K 7/10 (2006.01)
(52) U.S. Cl.
CPC ..... *G06K 7/10366* (2013.01); *G06K 7/10316* (2013.01)
(58) Field of Classification Search
CPC ........... G06K 7/10366; G06K 7/10316; G06K 7/10356; H04W 4/02; H04W 4/80; H04B 7/08; G01S 5/08
See application file for complete search history.

(56) References Cited

U.S. PATENT DOCUMENTS

2010/0328073 A1 12/2010 Nikitin et al.

FOREIGN PATENT DOCUMENTS

| CN | 1945593 A | 4/2007 |
| CN | 201751904 U | 2/2011 |

OTHER PUBLICATIONS

ISO 18000-6C:"EPC™ Radio-Frequency Identity Protocols Class-1 Generation-2 UHF RFID Protocol for Communications at 860 MHz-960 MHz Version 1.2.0." Oct. 23, 2008. total 108 pages.

*Primary Examiner* — Jamara A Franklin
(74) *Attorney, Agent, or Firm* — WOMBLE BOND DICKINSON (US) LLP

(57) ABSTRACT

This application describes a positioning method, apparatus, and system. The positioning apparatus includes an antenna selection circuit, a receiving processing circuit, and a processor, and the antenna selection circuit is coupled to the processor through the receiving processing circuit. The antenna selection circuit is coupled to an antenna array that includes M*N antenna elements, and the antenna selection circuit selects different combinations of antenna elements from the antenna array, where each combination of antenna elements includes L antenna elements. The processor controls the antenna selection circuit to select a combination of antenna elements from the antenna array. The receiving processing circuit receives an answer signal from a tag through L antenna elements selected by the antenna selection circuit, and processes the answer signal. The processor then positions the tag based on processed data.

20 Claims, 12 Drawing Sheets

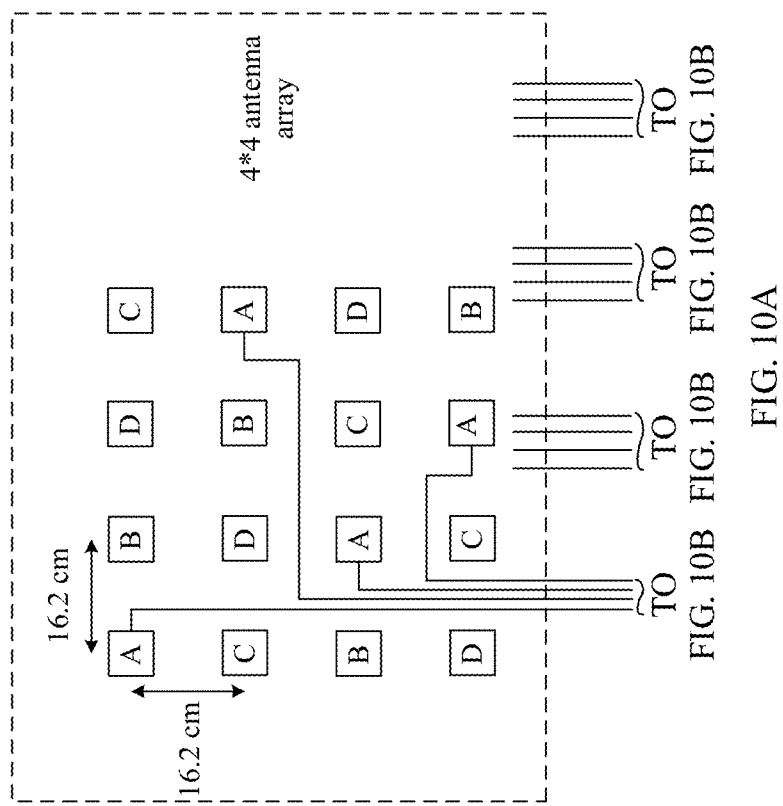

POSITIONING METHOD, APPARATUS, AND SYSTEM

CROSS-REFERENCE TO RELATED APPLICATIONS

This application is a continuation of International Application No. PCT/CN2022/115959, filed on Aug. 30, 2022, which claims priority to Chinese Patent Application No. 202111015824.2, filed on Aug. 31, 2021. The disclosures of the aforementioned applications are hereby incorporated by reference in their entireties.

TECHNICAL FIELD

Embodiments of this application relate to the field of radio frequency identification technologies, and in particular, to a positioning method, apparatus, and system.

BACKGROUND

A radio frequency identification (RFID) technology is a non-contact automatic identification technology, which can implement object identification and data exchange through wireless bidirectional communication. An RFID tag may be widely used in scenarios such as warehousing, logistics, and stores, for asset inventory, identification, and positioning. As shown in FIG. 1, the RFID tag can be used for goods positioning in a logistics warehouse.

FIG. 2 is a schematic diagram of a structure of an RFID positioning system. As shown in FIG. 2, an interaction end sends electronic product code (EPC) information of a tag to a transceiver reader. The reader sends commands to RFID tags through a plurality of antenna elements (such as antennas 1 to N in FIG. 2), and an RFID tag that matches the EPC information reflects a signal. The reader receives the reflected signal through a plurality of receive channels, and obtains a location of the RFID tag based on the reflected signal. In other words, in the solution shown in FIG. 2, the transceiver reader positions the RFID tag through a plurality of transmit (TX)/receive (RX) channels. In FIG. 2, a quantity of receive channels equals a quantity of antenna elements. A larger quantity of receive channels and a larger quantity of antenna elements indicate better positioning performance, such as a longer positioning distance and higher positioning accuracy, of the RFID tag.

However, the quantity of receive channels in the reader in FIG. 2 equals the quantity of antenna elements. If there are a large quantity of antenna elements, there are a large quantity of receive channels in the reader. Consequently, the reader is highly complex, and costs are high.

SUMMARY

Embodiments of this application provide a positioning method, apparatus, and system, which can reduce a quantity of receive channels. In addition, this reduces complexity and has low costs.

To achieve the foregoing objectives, the following technical solution is used in embodiments of this application.

A first aspect of embodiments of this application provides a positioning apparatus. The positioning apparatus includes an antenna selection circuit, a receiving processing circuit, and a processor, and the antenna selection circuit is coupled to the processor through the receiving processing circuit. The antenna selection circuit is configured to be coupled to an antenna array, the antenna array includes M*N antenna elements. M and N are integers greater than or equal to 1, and M and N do not both equal 1. The antenna selection circuit is configured to select different combinations of antenna elements from the antenna array, each combination of antenna elements includes L antenna elements, and L is a positive integer less than or equal to M*N. The processor is configured to send a first command to a tag, where the first command is used to inventory or query the tag. The processor is further configured to control the antenna selection circuit to select a combination of antenna elements from the antenna array. The receiving processing circuit is configured to: receive an answer signal from the tag through L antenna elements selected by the antenna selection circuit, and process the answer signal. The processor is further configured to position the tag based on data processed by the receiving processing circuit.

In this solution. L antenna elements are selected from the M*N antenna array through the antenna selection circuit, and the tag may be positioned based on the answer signal received by the selected L antenna elements. In this solution, a quantity of receive channels equals L, and the quantity of receive channels is less than a quantity of antenna elements included in the antenna array. Compared with a conventional technology in which the quantity of receive channels equals the quantity of antenna elements, this solution can significantly reduce the quantity of receive channels. In addition, this reduces complexity and has low costs.

With reference to the first aspect, in a possible embodiment, the antenna selection circuit includes L switching switches, one end of each switching switch is configured to be coupled to K antenna elements in the antenna array. K is a positive integer less than or equal to M*N/L, and the other end of each switching switch is coupled to the receiving processing circuit. The processor is configured to control the L switching switches to select L antenna elements from the antenna array.

In this solution. L antenna elements are selected from the antenna array by using the L switching switches, which can reduce a quantity of receive channels in the positioning apparatus. In addition, this reduces complexity and costs. In embodiments, each switching switch may implement a function of 1/K selection. The switching switch may be one 1/K selection switch, or may be a switch that consists of a plurality of switches and that can implement the function of 1/K selection. In other words, a logical function of each switching switch is to perform 1/K selection, and a physical form of the switching switch may indicate one switch, or may indicate a plurality of switches.

With reference to the first aspect, in a possible embodiment, the K antenna elements coupled to each switching switch are respectively located in different columns of the antenna array: the K antenna elements coupled to each switching switch are respectively located in different rows of the antenna array: or the K antenna elements coupled to each switching switch are respectively located in different rows and different columns of the antenna array.

In this solution, the K antenna elements coupled to each switching switch are respectively located in different columns, respectively located in different rows, or respectively located in different rows and different columns of the antenna array. In this way, more data information can be obtained by different combinations that are of antenna elements and that are selected by the L switching switches. Therefore, tag positioning accuracy can be improved.

With reference to the first aspect, in a possible embodiment, the processor is configured to control, once every first duration in a time period in which the tag sends one answer signal, the antenna selection circuit to switch a combination of antenna elements. The first duration is related to a duration in which the tag sends the answer signal and a quantity of different combinations of antenna elements included in the antenna array.

In embodiments, the duration in which the tag sends one answer signal may be a duration in which the tag sends an EPC frame. The processor may start timing from a time point at which an acknowledgment ACK command is sent. When the timing reaches a preset duration, the processor determines that the tag starts to send the EPC frame. Based on a time point at which the tag starts to send the EPC frame and the duration in which the tag sends the EPC frame, the processor may determine a time point at which the tag finishes sending the EPC frame. Starting from the time point at which the tag starts to send the EPC frame, the processor controls, once every first duration, the antenna selection circuit to switch a combination of antenna elements, until the tag finishes sending the EPC frame. In embodiments, the duration in which the tag sends the EPC frame equals a total quantity of symbols multiplied by a quantity of periods per symbol divided by a symbol rate.

In this solution, different combinations of antenna elements may be switched for a plurality of times in the time period in which the tag sends one EPC frame. Therefore, time for switching different combinations of antenna elements is short, and a positioning speed is fast. This is more applicable to a scenario sensitive to positioning time consumption.

With reference to the first aspect, in a possible embodiment, the processor is further configured to: send a plurality of query commands: and each time the query command is sent, control the antenna selection circuit to switch a combination of antenna elements once, where the query command is used to query the tag.

In this solution, a group of antenna elements is switched each time the processor sends the query command. Compared with the switching manner (in which different combinations of antenna elements are switched for a plurality of times in the time period in which the tag reports one EPC frame) in the foregoing embodiment, time for switching a combination of antenna elements in this switching manner is longer. This switching manner is more applicable to a scenario insensitive to positioning time consumption.

With reference to the first aspect, in a possible embodiment, the processor is further configured to: when a preset condition is met, stop switching a combination of antenna elements. The preset condition includes at least one of the following: when tag positioning is performed, a quantity of selected combinations of antenna elements reaches a preset quantity, where the preset quantity is less than or equal to the quantity of different combinations of antenna elements included in the antenna array: or a plurality of preset combinations of antenna elements are traversed in a process of switching different combinations of antenna elements.

In this solution, the processor may further stop switching a combination of antenna elements in the following case: When tag positioning is performed, the quantity of selected combinations of antenna elements reaches the preset quantity, or the plurality of preset combinations of antenna elements are traversed in the process in which different combinations of antenna elements are switched. In this way, the tag may be accurately positioned based on an answer signal received by selected different combinations of antenna elements.

With reference to the first aspect, in a possible embodiment, the receiving processing circuit includes L receiving processing subcircuits, and the processor is configured to: combine data processed by each of the L receiving processing subcircuits: perform weighting on the combined data: obtain, based on the weighted data, an azimuth corresponding to a combination of antenna elements: and position the tag based on azimuths corresponding to a plurality of combinations of antenna elements.

In this solution, when tag positioning is performed, azimuth filtering can be implemented by performing weighting on a signal obtained through combination. In addition, a phase shifter may be replaced by performing weighting processing on the signal obtained through combination. Therefore, the physical device, that is, the phase shifter, can be omitted, and costs are reduced.

It should be noted that in this application, to perform weighting on the signal obtained through combination is to perform, by using Q multi-beam filtering codebooks, azimuth filtering processing on the signal obtained through combination. Q beam directions correspond to Q groups of codebook coefficients. Each group of codebook coefficients may be multiplied by the signal obtained through combination for weighted combining, to obtain data that is obtained through weighting performed by using the group of codebook coefficients.

In embodiments, for the tag, a device that sends a command to the tag and a device that receives an answer signal from the tag may be a same device or may be different devices. For example, a repeater sends a command to the tag, and a reader receives an answer signal from the tag. For the tag, reception and sending are separately implemented by two devices. Therefore, reception and sending are implemented by not sharing a local oscillator. For another example, the reader sends a command to the tag, and the reader receives an answer signal from the tag. For the tag, reception and sending are implemented by one device. Therefore, reception and sending may be implemented by sharing the local oscillator. In a case in which reception and sending are implemented by not sharing the local oscillator, the foregoing processor may position the tag through combination and weighting. In a case in which reception and sending are implemented by sharing the local oscillator. For example, different combinations of antenna elements are switched at a time interval of ΔT. A location of each antenna element in the antenna array is known. In this case, the processor may calculate Δφ1 based on a frequency of w in the time interval of ΔT.

Then, Δφ2 is calculated based on data collected by the different combinations of antenna elements. Further, an azimuth θ is obtained according to the formula $$\Delta\varphi 2 - \Delta\varphi 1 = \frac{2\pi^* d^* \sin\theta}{\lambda}.$$

d represents a spacing between any two adjacent rows in the antenna array or a spacing between any two adjacent columns in the antenna array, and the spacing d is greater than or equal to λ/2. Then, a location of the tag is obtained based on azimuths corresponding to a plurality of combinations of antenna elements.

With reference to the first aspect, in a possible embodiment, the receiving processing circuit includes the L receiving processing subcircuits, each receiving processing subcircuit includes a frequency mixer and an analog-to-digital converter, and the frequency mixer in each receiving processing subcircuit is coupled to the processor through the analog-to-digital converter. The frequency mixer is configured to perform down-conversion processing on an answer signal received by an antenna element corresponding to the frequency mixer. The analog-to-digital converter is configured to convert, into a digital signal, the down-converted answer signal. The processor is configured to position the tag based on data processed by the analog-to-digital converter.

In this solution, down-conversion and analog-to-digital conversion processing are performed on an answer signal received by each receive channel, so that a frequency of the answer signal may be reduced. In addition, the answer signal is converted into a digital signal, and the digital signal is input into the processor. The processor may position the tag based on the received digital signal.

With reference to the first aspect, in a possible embodiment, the receiving processing circuit further includes a local oscillator and a power divider, and the local oscillator is coupled to the frequency mixer in each of the L receiving processing subcircuits through the power divider. The local oscillator is configured to provide a radio frequency clock for up-conversion or down-conversion. The frequency mixer is configured to perform, based on a radio frequency clock signal output by the local oscillator, down-conversion processing on the answer signal received by the antenna element corresponding to the frequency mixer.

In this solution, the local oscillator provides the radio frequency clock, and the frequency mixer may perform down-conversion processing on the answer signal based on the radio frequency clock signal, to reduce a frequency.

With reference to the first aspect, in a possible embodiment, radio frequency cables from the antenna selection circuit to frequency mixers in the receiving processing subcircuits have equal lengths, and signal traces from the power divider to the frequency mixers in the receiving processing subcircuits have equal lengths.

In this solution, the radio frequency cables from the antenna selection circuit to the frequency mixers in the receiving processing subcircuits are set to be of equal lengths, and the signal traces from the power divider to the frequency mixers in the receiving processing subcircuits are set to be of equal lengths. This can ensure that phases of signals received by different receive channels are the same, which not only can reduce a calculation amount, but also can improve tag positioning accuracy.

With reference to the first aspect, in a possible embodiment, the positioning apparatus is further configured to be coupled to a first antenna, an operating frequency of the first antenna differs from an operating frequency of the antenna element in the antenna array, and the positioning apparatus further includes a first transmitter circuit. The processor is further configured to send a first command to a repeater through the first transmitter circuit and the first antenna, where the first command is used to inventory or query the tag.

In embodiments, the first transmitter circuit is configured to send signaling to another device, where the first transmitter circuit and a first receiver circuit may operate in different modes. For example, an operating frequency band of the first transmitter circuit may differ from an operating frequency band of the first receiver circuit, and the first transmitter circuit is configured to send a select command, a query command, or an ACK command to the repeater.

In this solution, the positioning apparatus may send the first command to the repeater through the first antenna, and the repeater forwards the first command to the tag. In this way, when the tag is a passive RFID tag, the repeater can supply power to the tag, and the reader does not supply power to the tag. Therefore, a distance between the reader and the tag is not limited to 10 meters, and may reach 100 meters. This can increase a positioning distance of the passive RFID tag.

With reference to the first aspect, in a possible embodiment, the positioning apparatus further includes a second transmitter circuit, the receiving processing circuit includes the L receiving processing subcircuits, each receiving processing subcircuit further includes a circulator, the antenna selection circuit is coupled to the frequency mixer in each receiving processing subcircuit and the second transmitter circuit through the circulator in the receiving processing subcircuit, and the circulator is configured to implement receive/transmit combination. The processor is further configured to send a first command through the second transmitter circuit, the circulator, and the antenna array. The frequency mixer is configured to perform, by using the circulator, down-conversion processing on the answer signal received by the antenna element corresponding to the frequency mixer.

In embodiments, the second transmitter circuit is configured to send signaling to another device, where the second transmitter circuit and a first receiver circuit may operate in different modes. For example, an operating frequency band of the second transmitter circuit may differ from an operating frequency band of the first receiver circuit, and the second transmitter circuit is configured to send a select command, a query command, or an ACK command to the tag.

In this solution, the circulator is disposed in each receiving processing subcircuit, so that receive/transmit combination can be implemented. In this way, the antenna selection circuit not only can be used to receive a signal, but also can be used to send a command during positioning. Compared with a conventional technology in which a quantity of receive and transmit channels equals a quantity of antenna elements, this solution uses the antenna selection circuit to select L antenna elements from the antenna array, where the L antenna elements correspond to the L receive and transmit channels respectively. This can reduce the quantity of receive and transmit channels, and therefore is less complex and has low costs.

With reference to the first aspect, in a possible embodiment, radio frequency cables from the antenna selection circuit to circulators in the receiving processing subcircuits have equal lengths, and radio frequency cables from the circulators to the frequency mixers in the receiving processing subcircuits have equal lengths.

In this solution, the radio frequency cables from the antenna selection circuit to the circulators in the receiving processing subcircuits are set to be of equal lengths, and the radio frequency cables from the circulators to the frequency mixers in the receiving processing subcircuits are set to be of equal lengths. This can ensure that phases of signals received by different receive channels are the same, which not only can reduce a calculation amount, but also can improve tag positioning accuracy.

With reference to the first aspect, in a possible embodiment, radio frequency cables from the antenna elements in the antenna array to the antenna selection circuit have equal lengths.

In this solution, the radio frequency cables from the antenna elements in the antenna array to the antenna selection circuit are set to be of equal lengths. This can ensure that phases of signals received by different receive channels are the same, which not only can reduce a calculation amount, but also can improve tag positioning accuracy.

With reference to the first aspect, in a possible embodiment, the M*N antenna elements are arranged in M rows and N columns, and a spacing between any two adjacent rows in the antenna array equals a spacing between any two adjacent columns in the antenna array. In embodiments, each of the spacing between any two adjacent rows in the antenna array and the spacing between any two adjacent columns in the antenna array is greater than or equal to 0.5 times a wavelength.

A second aspect of embodiments of this application provides a positioning method. The method includes: selecting a combination of antenna elements from an antenna array, where the antenna array includes M*N antenna elements, M and N are integers greater than or equal to 1. M and N do not both equal 1, and each combination of antenna elements includes L antenna elements, where L is a positive integer less than M*N: receiving an answer signal from a tag based on selected L antenna elements: and positioning the tag based on the answer signal.

With reference to the second aspect, in a possible embodiment, the method further includes: switching a combination of antenna elements once every first duration in a time period in which the tag sends one answer signal.

With reference to the second aspect, in a possible embodiment, the first duration is related to a duration in which the tag sends the answer signal and a quantity of different combinations of antenna elements included in the antenna array.

With reference to the second aspect, in a possible embodiment, the method further includes: sending a plurality of query commands: and each time the query command is sent, switching a combination of antenna elements once, where the query command is used to query the tag.

With reference to the second aspect, in a possible embodiment, the method further includes: when a preset condition is met, stopping switching a combination of antenna elements, where the preset condition includes at least one of the following: a quantity of selected combinations of antenna elements reaches a preset quantity, where the preset quantity is less than or equal to the quantity of different combinations of antenna elements included in the antenna array: or a plurality of preset combinations of antenna elements are traversed in a process of switching different combinations of antenna elements.

With reference to the second aspect, in a possible embodiment, the positioning the tag based on the answer signal includes: combining data received by the L antenna elements included in the combination of antenna elements: performing weighting on the combined data; obtaining, based on the weighted data, an azimuth corresponding to the combination of antenna elements: and obtaining a location of the tag based on azimuths corresponding to a plurality of combinations of antenna elements.

For descriptions of effects of the second aspect and the embodiments of the second aspect, refer to descriptions of corresponding effects of the first aspect. Details are not described herein.

A third aspect of embodiments of this application provides a reader. The reader includes the positioning apparatus and the antenna array according to the first aspect or any one of the possible embodiments of the first aspect.

In embodiments, the reader may further include a first antenna.

A fourth aspect of embodiments of this application provides a positioning system. The positioning system includes a repeater, a reader, and a tag, where the reader includes the positioning apparatus and the antenna array according to the first aspect or any one of the possible embodiments of the first aspect. The reader is configured to send a first command to the repeater, where the first command is used to inventory or query the tag. The repeater is configured to: receive the first command from the reader, and forward the first command to the tag. The tag is configured to send an answer signal to the reader.

In embodiments, the first command includes at least one of a select command, a query command, or an acknowledgment ACK command.

A fifth aspect of embodiments of this application provides a computer-readable storage medium. The computer-readable storage medium includes computer program code. When the computer program code is run on a processor, the processor is enabled to perform the method according to the second aspect or any one of the possible embodiments of the second aspect.

A sixth aspect of embodiments of this application provides a computer program product. The computer program product includes program instructions. When the program instructions are executed, the method according to the second aspect or any one of the possible embodiments of the second aspect is implemented.

A seventh aspect of embodiments of this application provides a positioning device. The positioning device includes a processor and a memory. The memory is configured to store a computer program. The processor is configured to execute the computer program, so that the positioning device implements the method according to the second aspect or any one of the possible embodiments of the second aspect.

BRIEF DESCRIPTION OF DRAWINGS

FIG. 10A and FIG. 10B are a schematic diagram of a structure of yet another positioning apparatus according to an embodiment of this application:

DESCRIPTION OF EMBODIMENTS

Figure 1:
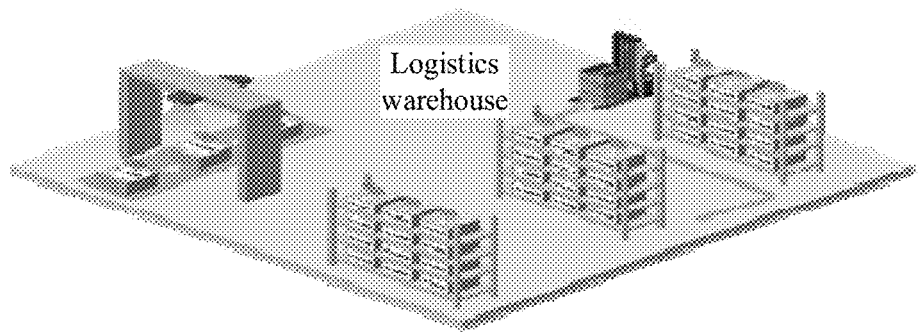
FIG. 1 is a schematic diagram of an application scenario of an RFID tag according to an embodiment of this application.

The following describes technical solutions in embodiments of this application with reference to accompanying drawings in embodiments of this application. In this application, "at least one" means one or more, and "a plurality of" means two or more. "And/or" describes an association relationship between associated objects, and indicates that three relationships may exist. For example, A and/or B may indicate the following cases: Only A exists, both A and B exist, and only B exists, where A and B may be singular or plural. The character "/" generally indicates an "or" relationship between the associated objects. "At least one of the following items (pieces)" or a similar expression thereof refers to any combination of these items, including a single item (piece) or any combination of a plurality of items (pieces). For example, at least one (piece) of a, b, or c may indicate: a, b, c, a and b, a and c, b and c, or a, b, and c, where a, b, and c may be singular or plural. In addition, to clearly describe the technical solutions in embodiments of this application, terms such as "first" and "second" are used in embodiments of this application to distinguish between same or similar items that provide basically same functions or purposes. A person skilled in the art may understand that the terms such as "first" and "second" do not limit a quantity and an execution sequence. For example. "first" in a first transmitter circuit and "second" in a second transmitter circuit in embodiments of this application are merely used to distinguish between different transmitter circuits. Descriptions such as "first" and "second" in embodiments of this application are merely used for indicating and distinguishing between described objects, do not show a sequence, do not indicate a specific limitation on a quantity of devices in embodiments of this application, and cannot constitute any limitation on embodiments of this application.

It should be noted that in this application, the term such as "example" or "for example" is used to indicate an example, an illustration, or a description. Any embodiment or design scheme described as an "example" or "for example" in this application should not be explained as being more preferred or having more advantages than another embodiment or design scheme. Exactly, use of the term such as "example" or "for example" is intended to present a relative concept in a specific manner.

It should be noted that "couplings" in this application indicate a direct connection or an indirect connection. For example, if a is coupled to b, it may indicate that a is directly connected to b, or that a is connected to b through c.

It should be noted that, in this application, an antenna array includes M*N antenna elements. The antenna element in the antenna array may differ from a first antenna and a second antenna. The antenna element, the first antenna, and the second antenna may be configured to implement different antenna functions.

Currently. RFID tags may be classified into an active RFID tag, a passive RFID tag, and a semi-active RFID tag. The passive RFID tag does not include a battery, and supplies power to the passive RFID tag by collecting wireless energy (at an ultra high frequency (UHF) band that generally ranges from 860 MHz to 960 MHZ). For example, an antenna element of the passive RFID tag may convert received electromagnetic wave energy into electric energy, activate a chip in the passive RFID tag, and send data that is in the chip of the passive RFID tag. A reader performs wireless communication with the passive RFID tag through the antenna element, to perform a read or write operation on a tag identification code of and memory data in the passive RFID tag. The passive RFID tag features a small size, a low cost, and a long service life, and is widely used in scenarios such as warehousing, logistics, and stores, for asset inventory, identification, and positioning.

Readers are generally classified into a fixed reader and a mobile reader. The fixed reader has a fixed position, and may be usually mounted on a wall. The mobile reader may be, for example, a handheld RFID scanner.

Figure 2:
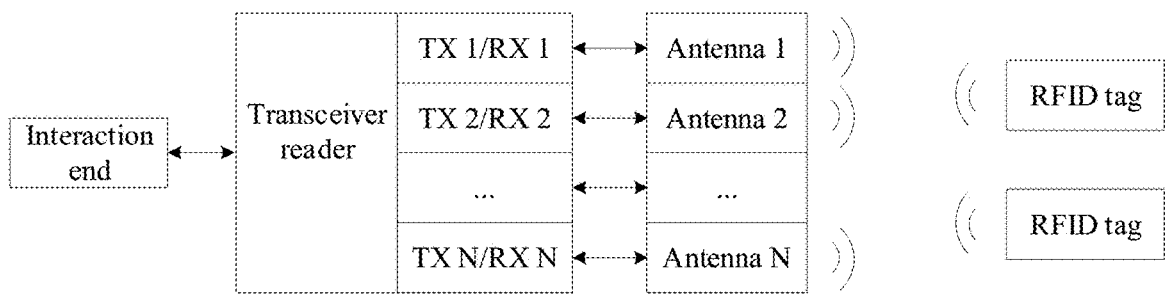
FIG. 2 is a schematic diagram of a structure of an RFID positioning system according to an embodiment of this application.

In a positioning system shown in FIG. 2, a quantity of receive channels in a reader equals a quantity of antenna elements. If there are a large quantity of antenna elements, there are a large quantity of receive channels in the reader. Consequently, the reader is highly complex, and costs are high. In addition, antennas 1 to N in FIG. 2 are duplex antennas. The reader sends a command to a passive RFID tag through the N antennas, and receives a reflected signal from the passive RFID tag through the N antennas. It is assumed that the RFID tag in FIG. 2 is the passive RFID tag. In this case, transmit power of the reader is limited. Therefore, when the passive RFID tag performs charging by collecting wireless energy transmitted by the reader, a distance between the passive RFID tag and the reader can reach only 10 meters, and cannot reach 100 meters. Consequently, a positioning distance is limited.

Figure 3:
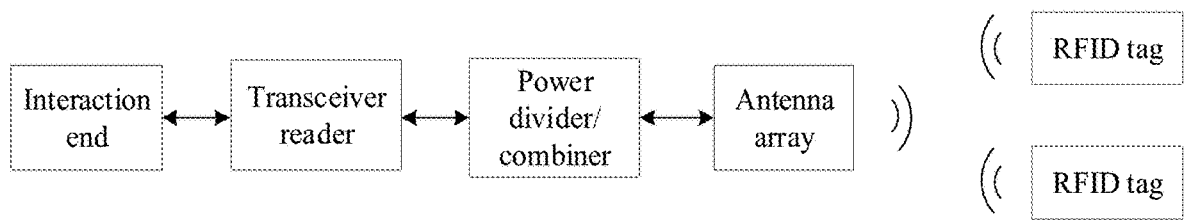
FIG. 3 is a schematic diagram of a structure of another RFID positioning system according to an embodiment of this application.

FIG. 3 is a schematic diagram of a structure of another positioning system. A power divider and a power combiner in FIG. 3 may be implemented by a phase shifter, and the phase shifter and an antenna array jointly implement a function of a phased array antenna. An angle of a radiation beam of the phased array antenna is adjustable. Therefore, scanning can be sequentially performed on a search plane, and a location of a passive RFID tag is calculated by counting a quantity of times that the passive RFID tag occurs in different antenna regions.

The antenna array in FIG. 3 consists of duplex antennas. A reader sends a command to the passive RFID tag through the antenna array, and receives a reflected signal from the passive RFID tag through the antenna array. It is assumed that an RFID tag in FIG. 3 is the passive RFID tag. In this case, transmit power of the reader is limited. Therefore, when the passive RFID tag performs charging by collecting wireless energy transmitted by the reader, a distance between the passive RFID tag and the reader can reach only 10 meters, and cannot reach 100 meters. Consequently, a positioning distance is limited. In addition, the power divider and the power combiner in FIG. 3 are implemented by using the phase shifter. The phase shifter is a physical device and is costly. Therefore, use of the phase shifter in the positioning system causes high costs of the positioning system.

If there are a large quantity of antenna elements, there are a large quantity of receive channels in a reader. Consequently, the reader is highly complex. In addition, a positioning distance of a passive RFID tag is limited to only 10 meters, and cannot reach 100 meters. Further, use of a phase shifter causes high costs. To resolve all the foregoing issues, embodiments of this application provide a positioning apparatus. The positioning apparatus may select different combinations of antenna elements from an antenna array by using an antenna selection circuit, which can reduce a quantity of receive channels. In addition, this reduces complexity and has low costs. In addition, a repeater is used to supply power to a tag, and the reader does not supply power to the tag. Therefore, a distance between the reader and the tag is not limited to 10 meters, and may reach 100 meters. Moreover, the phase shifter may be replaced by performing weighting on an answer signal from the tag when tag positioning is performed. Therefore, the phase shifter is omitted when tag positioning is performed, and costs can be reduced.

When the positioning apparatus provided in embodiments of this application positions a tag, the tag may be a passive RFID tag or an active RFID tag. A specific type of the tag is not limited in embodiments of this application. An operating frequency of the active RFID tag differs from an operating frequency of the passive RFID tag. Therefore, the positioning apparatus uses different circuit structures when positioning different types of tags.

Figure 4:
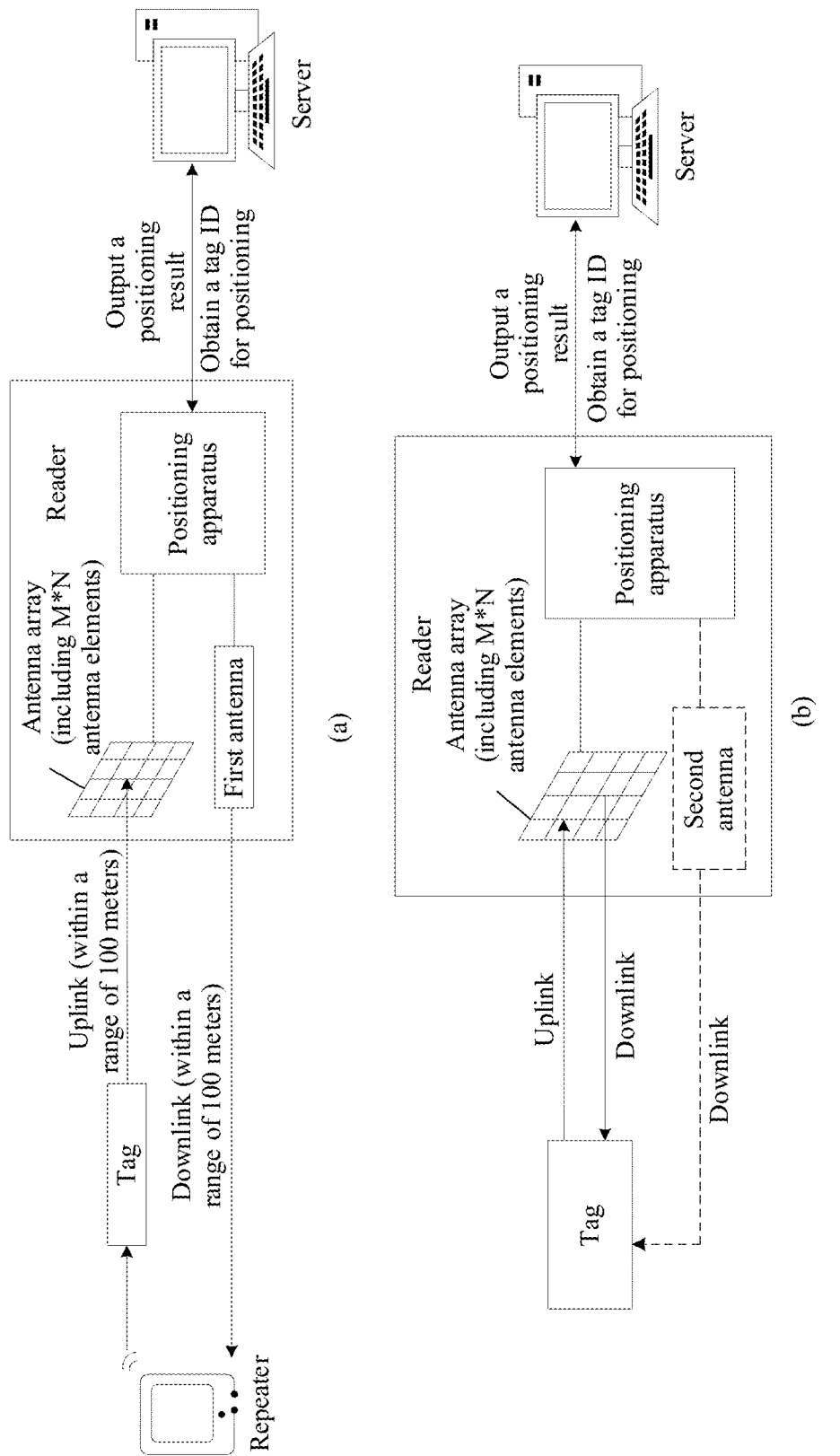
FIG. 4 is a schematic diagram of a structure of still another RFID positioning system according to an embodiment of this application.

The positioning apparatus provided in embodiments of this application may be applied to a positioning system shown in (a) in FIG. 4. As shown in (a) in FIG. 4, the positioning system includes a reader, a repeater, and a tag. In embodiments, the positioning system may further include a server.

In the positioning system shown in (a) in FIG. 4, communication in a downlink (from the reader to the repeater) may be performed in a wired or wireless manner. The following separately describes working processes of different communication manners used in the downlink in the positioning system.

As shown in (a) in FIG. 4, the reader includes a positioning apparatus, and an antenna array and a first antenna that are coupled to the positioning apparatus. The antenna array may include M*N antenna elements, where M and N are integers greater than or equal to 1, and M and N do not both equal 1. An operating frequency of the first antenna differs from an operating frequency of the antenna element in the antenna array. For example, the first antenna may be a single rod antenna whose operating frequency differs from the operating frequency of the antenna element in the antenna array.

If wireless communication is performed in the downlink from the reader to the repeater, the reader sends a select select command for tag inventory to the repeater through the first antenna by using a radio frequency band, to select the tag. The select command carries EPC information of the tag, and an identifier (ID) of the tag may be obtained from the server. Then, the reader delivers a query query command or an acknowledgment ACK command to the repeater through the first antenna by using the radio frequency band, so that the tag reports an answer signal. In embodiments, for example, the tag shown in (a) in FIG. 4 is a passive RFID tag. In this case, the radio frequency band used in the downlink from the reader to the repeater may be an ultra high frequency UHF band that ranges from 840 MHz to 845 MHZ.

When wired communication is performed in the downlink from the reader to the repeater, the reader includes the positioning apparatus, and the antenna array and a cable that are coupled to the positioning apparatus. The cable includes but is not limited to a physical cable such as a network cable, a serial cable, or an optical fiber.

When wired communication is performed in the downlink from the reader to the repeater, the reader sends a select select command for tag inventory to the repeater through the cable such as the network cable, the serial cable, or the optical fiber, to select the tag. The select command carries EPC information of the tag. Then, the reader delivers a query query command or an acknowledgment ACK command to the repeater through the cable such as the network cable, the serial cable, or the optical fiber, so that the tag reports an answer signal.

Communication in an uplink (from the repeater to the tag to the reader) of the positioning system shown in (a) in FIG. 4 may be performed in a wireless manner. When wireless communication is performed in the uplink from the repeater to the tag to the reader, if the tag is a passive RFID tag, the repeater that is independently deployed is responsible for performing wireless charging on the passive RFID tag, and forwarding a select command, a query command, and an ACK command that conform to a protocol standard to the passive RFID tag. The passive RFID tag is responsible for receiving air interface signaling, and modulating and transmitting information such as an EPC of the passive RFID tag to an air interface in a backscattering manner. The positioning apparatus in the reader receives a radio signal from the air interface through the M*N antenna array, demodulates the received signal to obtain a location of the passive RFID tag, and sends a positioning result of the passive RFID tag to the server. In embodiments, for example, the tag shown in (a) in FIG. 4 is the passive RFID tag. In this case, a radio frequency band used in the uplink from the repeater to the tag to the reader may be an ultra high frequency UHF band that ranges from 920.5 MHZ to 924.5 MHZ.

In embodiments, when the repeater forwards a query command from the reader, the tag reports an RN16 frame in response to the query command. When the repeater forwards an ACK command from the reader, the tag reports an EPC frame in response to the ACK command.

With reference to the working processes of the uplink and the downlink in the positioning system, it can be learned that in the positioning system shown in (a) in FIG. 4, the reader sends a command to the repeater through the first antenna or the cable, the repeater forwards the command to the tag, the tag sends an answer signal in response to the command forwarded by the repeater, and the reader receives, through the antenna array, a signal reflected by the tag. When the tag is the passive RFID tag, in the positioning system shown in (a) in FIG. 4, the repeater may charge the passive RFID tag (a single repeater may supply power to a passive RFID tag within a range of about 10 meters), and the reader does not charge the passive RFID tag. Therefore, a distance between the passive RFID tag and the reader is not limited to 10 meters, and may reach 100 meters. As shown in (a) in FIG. 4, a communication distance in a downlink in which the reader sends a command to the repeater may reach 100 meters. A communication distance in an uplink in which the reader receives a reflected signal from the passive RFID tag may also reach 100 meters. The distance between the repeater and the passive RFID tag is about 10 meters.

In embodiments, in the positioning system shown in (a) in FIG. 4, the repeater may be deployed in a mobile manner, or may be deployed in a fixed manner. When the repeater is deployed in the mobile manner, a battery may be used to supply power to the repeater. In the foregoing positioning system, one reader may be networked with one repeater, or may be networked with a plurality of repeaters. This is not limited in this embodiment of this application.

Figure 5:
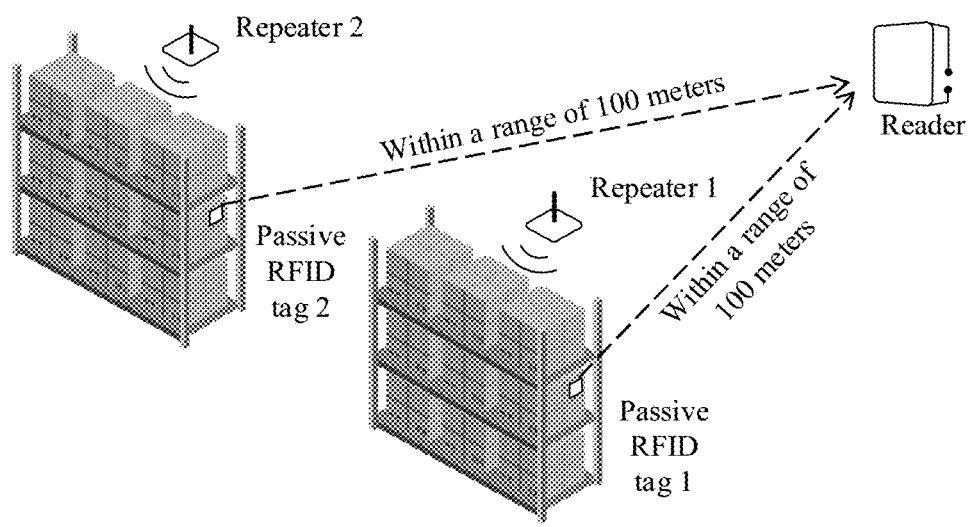
FIG. 5 is a schematic diagram of an application scenario of an RFID positioning system according to an embodiment of this application.

For example, as shown in FIG. 5, one reader is networked with two repeaters. The reader in FIG. 5 may send a select command to a repeater 1 to select a passive RFID tag 1. Then, the reader delivers a query query command or an acknowledgment ACK command to the repeater. The repeater forwards the command sent by the reader. In response to the command sent by the repeater, the passive RFID tag 1 reports an answer signal. Based on the answer signal reported by the passive RFID tag 1, the reader obtains a location of the passive RFID tag 1. The reader in FIG. 5 may also send a select command to a repeater 2 to select a passive RFID tag 2. Then, the reader delivers a query query command or an acknowledgment ACK command to the repeater. The repeater forwards the command sent by the reader. In response to the command sent by the repeater, the passive RFID tag 2 reports an answer signal. Based on the answer signal reported by the passive RFID tag 2, the reader obtains a location of the passive RFID tag 2.

The positioning apparatus provided in embodiments of this application may also be applied to a positioning system shown in (b) in FIG. 4. As shown in (b) in FIG. 4, the positioning system includes a reader and a tag. In embodiments, the positioning system may further include a server.

When the tag shown in (b) in FIG. 4 is an active RFID tag, a distance between the reader and the active RFID tag is not limited to 10 meters because the active RFID tag does not need to perform charging by collecting wireless energy transmitted by the reader.

When the tag shown in (b) in FIG. 4 is a passive RFID tag, the reader supplies power to the passive RFID tag. Transmit power of the reader is limited. Therefore, when the passive RFID tag performs charging by collecting wireless energy transmitted by the reader, a distance between the passive RFID tag and the reader is limited. Therefore, in order to increase a positioning distance of the passive RFID tag, the positioning system shown in (a) in FIG. 4 may be used when positioning of the passive RFID tag is performed.

In embodiments, as shown in (b) in FIG. 4, the positioning system may further include a second antenna, and an operating frequency of the second antenna may differ from an operating frequency of an antenna element in an antenna array. The reader may send a command to a tag through the second antenna, and receive an answer signal from the tag through the antenna element in the antenna array, so that a receive channel and a transmit channel of the reader are separated.

It may be understood that a system architecture shown in (a) in FIG. 4 differs from a system architecture shown in (b) in FIG. 4. In the system architecture shown in (a) in FIG. 4, the reader sends a command to the repeater through the first antenna, the repeater forwards the command to the tag, and the reader receives an answer signal from the tag through the antenna array. Therefore, for the tag, the repeater sends the command to the tag, and the reader receives the answer signal from the tag. In this case, reception and sending are separately implemented by two devices. Therefore, reception and sending in the system shown in (a) in FIG. 4 may be implemented by not sharing a local oscillator. In the system architecture shown in (b) in FIG. 4, the reader sends a command to the tag through the antenna array or the second antenna, and receives an answer signal from the tag through the antenna array. For the tag, the reader sends the command to the tag, and the reader receives the answer signal from the tag. In this case, reception and sending are implemented in one device. Therefore, reception and sending in the system shown in (b) in FIG. 4 may be implemented by sharing a local oscillator. A specific system and scenario to which the positioning apparatus is applied are not limited in embodiments of this application. FIG. 4 is merely an example for description.

Figure 6:
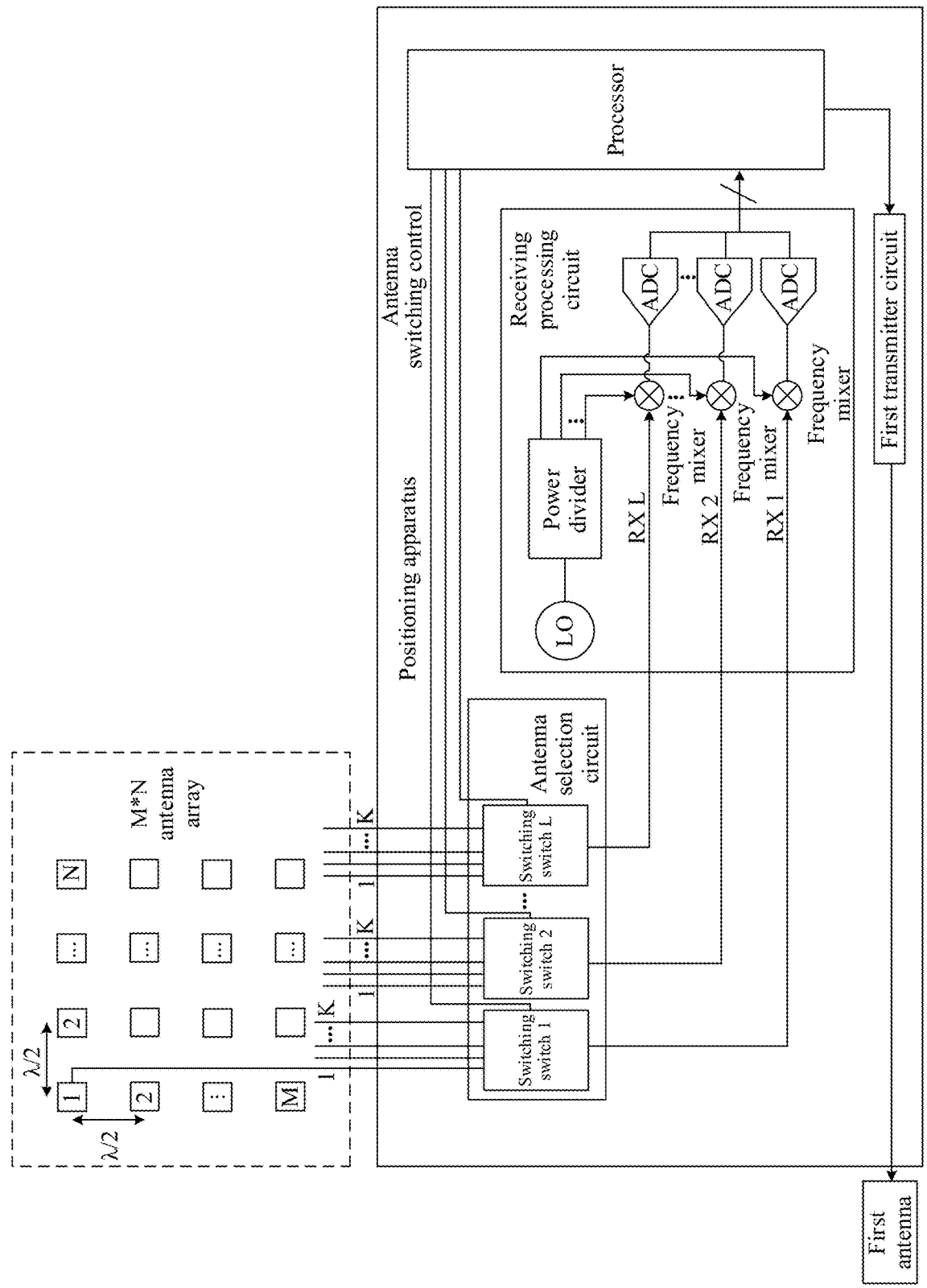
FIG. 6 is a schematic diagram of a structure of a positioning apparatus according to an embodiment of this application.

An embodiment of this application provides a positioning apparatus. As shown in FIG. 6, the positioning apparatus includes an antenna selection circuit, a receiving processing circuit, and a processor. The antenna selection circuit is coupled to the processor through the receiving processing circuit. The antenna selection circuit is configured to be coupled to an antenna array. The antenna array includes M*N antenna elements. The antenna selection circuit is configured to select different combinations of antenna elements from the antenna array. Each combination of antenna elements includes L antenna elements, where L is a positive integer less than M*N.

The M*N antenna elements included in the antenna array are arranged in M rows and N columns, and a spacing between any two adjacent rows in the antenna array equals a spacing between any two adjacent columns in the antenna array. The spacing is greater than or equal to 0.5 times a wavelength. It should be noted that, an operating frequency at which the positioning apparatus positions an active RFID tag differs from an operating frequency at which the positioning apparatus positions a passive RFID tag, and therefore corresponding wavelengths are also different. Therefore, the foregoing spacing may also vary when different types of RFID tags are positioned. The following embodiment is described by using an example in which each of the spacing between any two adjacent rows in the antenna array and the spacing between any two adjacent columns in the antenna array is 0.5 times the wavelength, that is. 16.2 cm. 16.2 cm represents a half wavelength corresponding to the operating frequency of the passive RFID tag.

In embodiments, a plurality of antenna elements in the antenna array may be same antenna elements (for example, all of the M*N antenna elements are circularly polarized antennas). Any two adjacent antenna elements are equally spaced, and a spacing between centers of two adjacent antenna elements is not less than a half wavelength of an electromagnetic wave signal in space.

A quantity of antenna elements included in the antenna array is related to a distance for positioning and identification. A larger quantity of antenna elements included in the antenna array indicates a longer positioning distance. A smaller quantity of antenna elements included in the antenna array indicates a shorter positioning distance. For example, a 2*2 antenna array may be used for short-distance positioning (for example, within a range of 10 meters), and a 4*4 antenna array may be used for long-distance positioning (for example, within a range of 100 meters). In this embodiment of this application, the quantity of antenna elements included in the antenna array is not limited. In actual application, the quantity of antenna elements included in the antenna array may be set based on different positioning distances.

Figure 7:
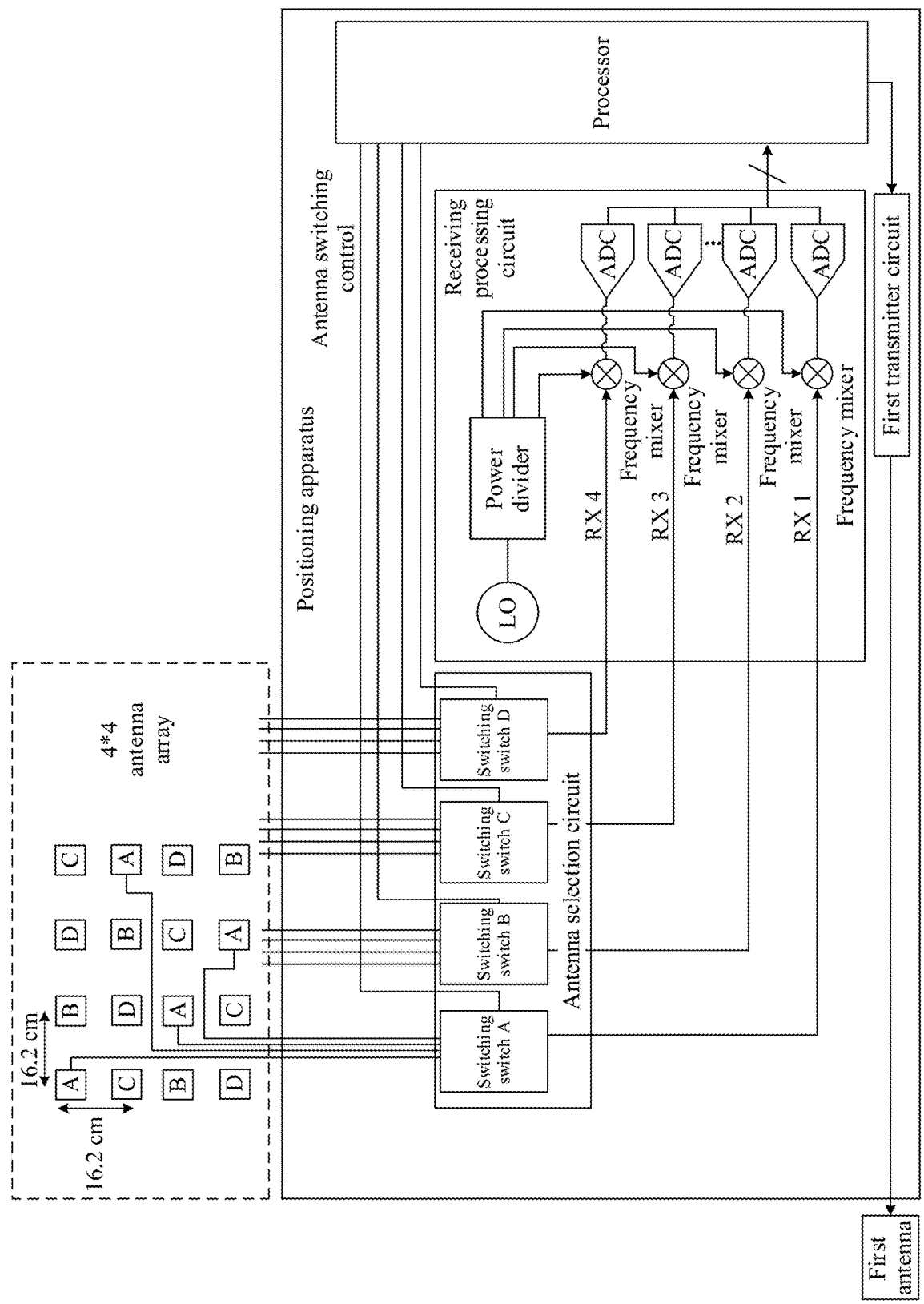
FIG. 7 is a schematic diagram of a structure of another positioning apparatus according to an embodiment of this application.

For example, as shown in FIG. 7, an antenna array includes 16 antenna elements that are arranged in four rows and four columns. The 16 antenna elements may be same antenna elements. To be specific, all of the 16 antenna elements are circularly polarized antennas. An area of the antenna array shown in FIG. 7 is about 65 cm*65 cm, and a distance between any two adjacent antenna elements is about 16.2 cm.

Figure 8:
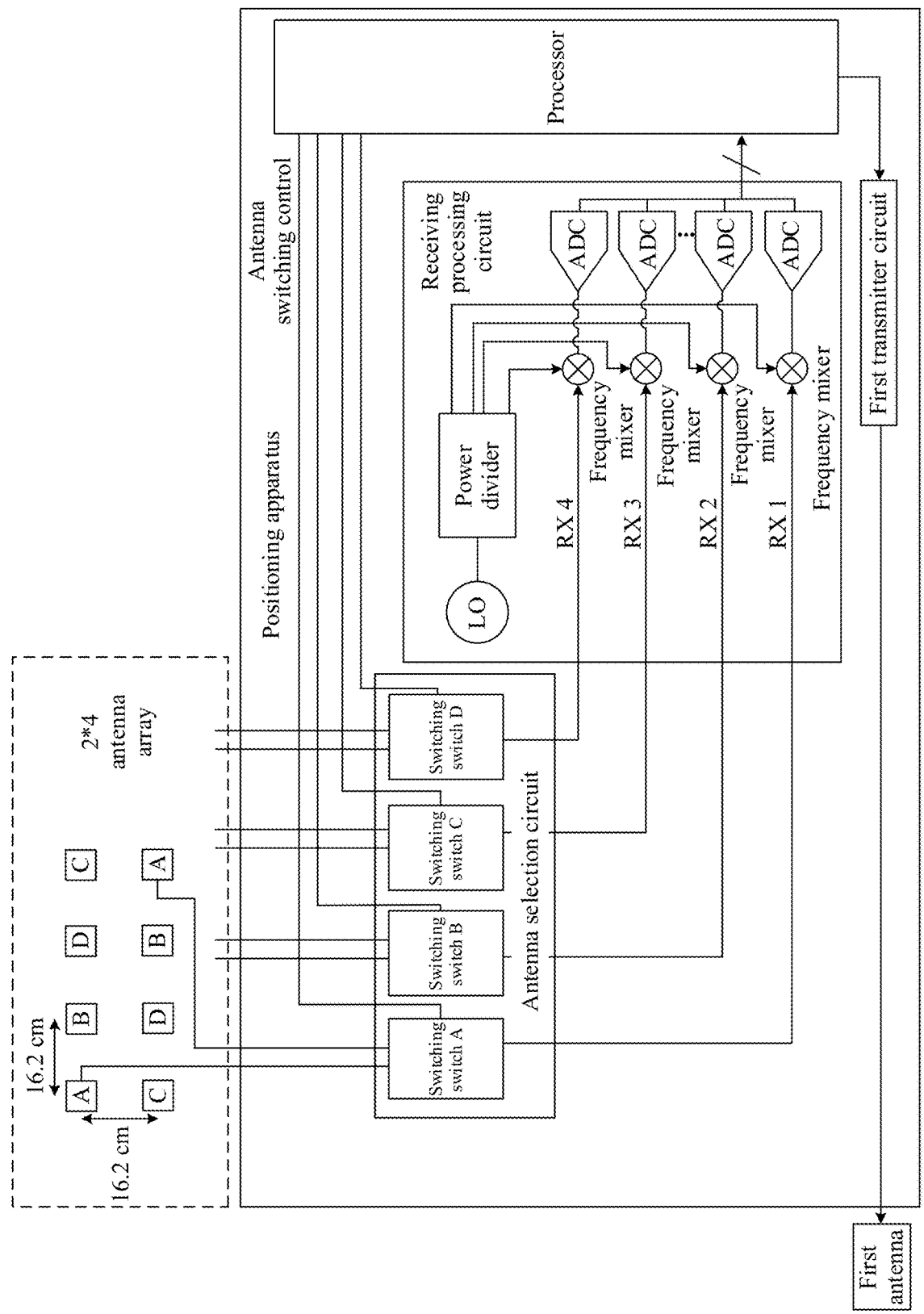
FIG. 8 is a schematic diagram of a structure of still another positioning apparatus according to an embodiment of this application.

For another example, as shown in FIG. 8, an antenna array includes eight antenna elements that are arranged in two rows and four columns. The eight antenna elements may be same antenna elements. To be specific, all of the eight antenna elements are circularly polarized antennas. An area of the antenna array shown in FIG. 8 is about 65 cm*32.5 cm, and a distance between any two adjacent antenna elements is about 16.2 cm.

It should be noted that values of M and N may be the same or may be different. When the values of M and N are different. M may be less than or greater than N. This is not limited in this embodiment of this application.

As shown in FIG. 6, the antenna selection circuit includes L switching switches, and each switching switch is a 1/K selection switch. One end of each switching switch is configured to be coupled to K antenna elements in the antenna array, where K is a positive integer less than or equal to M*N/L. The other end of each switching switch is coupled to the receiving processing circuit, and each switching switch is configured to select one antenna element from the K antenna elements coupled to the switching switch.

In embodiments, the K antenna elements coupled to each switching switch are respectively located in different columns of the antenna array. Alternatively, the K antenna elements coupled to each switching switch are respectively located in different rows of the antenna array. Alternatively, the K antenna elements coupled to each switching switch are respectively located in different rows and different columns of the antenna array.

For example, as shown in FIG. 7, L, K, M, and N all equal 4, and four antenna elements coupled to each switching switch are respectively located in different rows and different columns of the antenna array. The positioning apparatus is configured to be coupled to a 4*4 antenna array, where the 4*4 antenna array includes a total of 16 antenna elements in four rows and four columns. The positioning apparatus includes four switching switches: switching switches A to D. The switching switch A is configured to be coupled to four antenna elements A in the antenna array, where the four antenna elements A may be respectively located in different rows and different columns of the antenna array. The switching switch A is configured to select one antenna element A from the four antenna elements A. The switching switch B is configured to be coupled to four antenna elements B in the antenna array, where the four antenna elements B may be respectively located in different rows and different columns of the antenna array. The switching switch B is configured to select one antenna element B from the four antenna elements B. The switching switch C is configured to be coupled to four antenna elements C in the antenna array, where the four antenna elements C may be respectively located in different rows and different columns of the antenna array. The switching switch C is configured to select one antenna element C from the four antenna elements C. The switching switch D is configured to be coupled to four antenna elements D in the antenna array, where the four antenna elements D may be respectively located in different rows and different columns of the antenna array. The switching switch D is configured to select one antenna element D from the four antenna elements D. It may be understood that, one switching switch is coupled to a plurality of antenna elements that are located in different rows and different columns, so that more data information can be obtained by selected different combinations of antenna elements. This can improve tag positioning accuracy.

In embodiments, each switching switch may implement a function of 1/K selection. The switching switch may be one 1/K selection switch, or may be a switch that consists of a plurality of switches and that can implement the function of 1/K selection. For example, K equals four, and each switching switch may implement a function of ¼ selection. In this case, the switching switch may be one ¼ selection switch, or may be a switch that consists of two ½ selection switches and that can implement the function of ¼ selection. In other words, a logical function of each switching switch is to perform 1/K selection, and a physical form of the switching switch may indicate one switch, or may indicate a plurality of switches.

Specific values of L and K are not limited in this embodiment of this application. L and K may be the same or may be different. If L and K are different. L may be greater than or less than K. This is not limited in this embodiment of this application. In FIG. 7, an example in which L. K. M, and N all equal 4 is used for illustration.

In embodiments, radio frequency cables from the antenna elements in the antenna array to the antenna selection circuit have equal lengths. For example, the antenna selection circuit includes L switching switches. Radio frequency cables from the antenna elements in the antenna array to switching switches coupled to the antenna elements have equal lengths.

For example, as shown in FIG. 7, lengths of radio frequency cables from the four antenna elements A in the antenna array to the switching switch A all equal a: lengths of radio frequency cables from the four antenna elements B in the antenna array to the switching switch B all equal a: lengths of radio frequency cables from the four antenna elements C in the antenna array to the switching switch C all equal a: and lengths of radio frequency cables from the four antenna elements D in the antenna array to the switching switch D all equal a.

It may be understood that, if the radio frequency cables from the antenna elements in the antenna array to the antenna selection circuit have unequal lengths, phases of signals received by different antenna elements may change. Therefore, when tag positioning is performed, the phases of the signals received by different antenna elements need to be adjusted to be the same. If phases of different antenna elements are different, a location of a positioned tag may be inaccurate. Therefore, in this embodiment of this application, the radio frequency cables from the antenna elements in the antenna array to the antenna selection circuit are set to be of equal lengths. This not only can reduce a calculation amount, but also can improve tag positioning accuracy.

The processor is configured to send a first command to the tag, where the first command is used to inventory or query the tag.

The processor is further configured to control the antenna selection circuit to select a combination of antenna elements from the antenna array.

The receiving processing circuit is configured to: receive an answer signal from the tag through L antenna elements selected by the antenna selection circuit, and process the answer signal.

The processor is further configured to position the tag based on data processed by the receiving processing circuit.

When the antenna selection circuit includes L switching switches, the processor is configured to control the L switching switches to select a combination of antenna elements from the antenna array, where the combination of antenna elements includes L antenna elements. Each switching switch is configured to select one antenna element from K antenna elements coupled to the switching switch.

For example, as shown in FIG. 7, L, K, M, and N all equal 4. At a same moment, the antenna selection circuit may control the switching switches A to D to select a combination of antenna elements, where the combination of antenna elements includes one antenna element A, one antenna element B, one antenna element C, and one antenna element D. To be specific, at the same moment, the switching switch A selects one of the four antenna elements A in the antenna array, the switching switch B selects one of the four antenna elements B in the antenna array, the switching switch C selects one of the four antenna elements C in the antenna array, and the switching switch D selects one of the four antenna elements D in the antenna array. Four antenna elements selected by the switching switches A to D may form a combination of antenna elements.

The receiving processing circuit receives the answer signal from the tag through the L antenna elements. Therefore, a quantity of receive channels in the positioning apparatus in this embodiment of this application equals a quantity of switching switches in the antenna selection circuit. When the antenna selection circuit includes L switching switches, the receiving processing circuit may receive the answer signal from the tag through L antenna elements selected by the L switching switches. In other words, a quantity of receive channels in the receiving processing circuit equals L in this embodiment of this application, and the quantity that equals L and that is of receive channels is less than a quantity of antenna elements included in the antenna array.

For example, as shown in FIG. 7, the antenna array includes 16 antenna elements, and the antenna selection circuit includes four switching switches. The positioning apparatus includes four receive channels: RX 1 to RX 4. Apparently, a quantity that equals 4 and that is of receive channels in the positioning apparatus is less than a quantity that equals 16 and that is of antenna elements in the antenna array. In a conventional technology, a quantity of receive channels equals a quantity of antenna elements. By contrast, the positioning apparatus provided in this embodiment of this application selects, by using the antenna selection circuit. L antenna elements from the M*N antenna array to receive data. This can significantly reduce the quantity of receive channels. In addition, this reduces complexity and has low costs.

In embodiments, as shown in FIG. 6 to FIG. 8, the receiving processing circuit may include a local oscillator (LO), a power divider, and L receiving processing subcircuits. Each receiving processing subcircuit includes a frequency mixer and an analog-to-digital converter (ADC). The local oscillator is coupled to the frequency mixer in each of the L receiving processing subcircuits through the power divider, and the frequency mixer in each receiving processing subcircuit is coupled to the processor through the analog-to-digital converter.

The local oscillator is configured to provide a radio frequency clock for up-conversion or down-conversion.

The frequency mixer is configured to perform, based on a radio frequency clock signal output by the local oscillator, down-conversion processing on an answer signal received by an antenna element corresponding to the frequency mixer.

The analog-to-digital converter is configured to convert, into a digital signal, the down-converted answer signal.

In embodiments, the processor positions the tag based on data processed by the analog-to-digital converter.

For example, as shown in FIG. 7, each receiving processing subcircuit corresponds to a receive channel, and the receive channel receives an answer signal from the tag through an antenna element selected by a corresponding switching switch. For example, a frequency of the answer signal received by the receive channel is 921 MHZ. The frequency mixer in each receiving processing subcircuit performs down-conversion processing on the radio frequency clock signal output by the local oscillator and an answer signal received by the receive channel. A frequency of a signal output by the frequency mixer is less than a frequency of the answer signal received by the receive channel (for example, the frequency of the signal output by the frequency mixer may be dozens of MHZ). Then, the ADC in the receiving processing subcircuit performs analog-to-digital conversion on a signal obtained through down-conversion. The processor positions the tag based on data obtained through conversion performed by the ADC in each receiving processing subcircuit.

In embodiments, radio frequency cables from switching switches in the antenna selection circuit to frequency mixers in the receiving processing subcircuits corresponding to the switching switches have equal lengths. For example, as shown in FIG. 7, a length of a radio frequency cable from the switching switch A to a frequency mixer coupled to the switching switch A equals b, a length of a radio frequency cable from the switching switch B to a frequency mixer coupled to the switching switch B also equals b, a length of a radio frequency cable from the switching switch C to a frequency mixer coupled to the switching switch C also equals b, and a length of a radio frequency cable from the switching switch D to a frequency mixer coupled to the switching switch D also equals b. It may be understood that, if the radio frequency cables from the switching switches to the frequency mixers coupled to the switching switches have unequal lengths, phases of answer signals received by different frequency mixers may be different. In this case, when tag positioning is performed, the phases of the answer signals received by different frequency mixers need to be adjusted to be the same. If the phases of the answer signals received by different frequency mixers are different, a location of a positioned tag may be inaccurate. Therefore, in this embodiment of this application, the radio frequency cables from the switching switches in the antenna selection circuit to the frequency mixers in the receiving processing subcircuits corresponding to the switching switches are set to be of equal lengths. This not only can reduce a calculation amount, but also can improve tag positioning accuracy.

In embodiments, signal traces from the power divider to the frequency mixers in the receiving processing subcircuits have equal lengths.

For the tag, a device that sends a command to the tag and a device that receives an answer signal from the tag may be a same device or may be different devices. When the system architecture shown in (a) in FIG. 4 is used for the tag, the repeater sends a command to the tag, and the reader receives an answer signal from the tag. In this case, reception and sending are separately implemented by two devices. Therefore, reception and sending are implemented by not sharing the local oscillator. When the system architecture shown in (b) in FIG. 4 is used, for the tag, the reader sends a command to the tag, and the reader receives an answer signal from the tag. In this case, reception and sending are implemented by one device. Therefore, reception and sending may be implemented by sharing the local oscillator. The tag may be positioned in the following two cases based on whether reception and sending are implemented by sharing the local oscillator.

Case 1: Reception and sending are implemented by not sharing the local oscillator. In this case, the foregoing processor may position the tag by performing the following four operations:

Operation a: Combine data processed by each of the L receiving processing subcircuits.

For example, as shown in FIG. 7, after L receive channels each receive an answer signal, the answer signal received by each receive channel may be processed by using the frequency mixer and the analog-to-digital converter in each receiving processing subcircuit. Then, the processor combines data processed by the L receiving processing subcircuits.

For example, data that is of the L receive channels and that is received by the processor may be combined into an L*1 vector, where the vector may be expressed as $X_{N*1}(t)=[A*e^{jwt+\varphi 1}, A*e^{jwt+\varphi 2}, A*e^{jwt+\varphi 3}, \ldots, A*e^{jwt+\varphi L}]$. $A*e^{jwt+\varphi 1}$, $A*e^{jwt+\varphi 2}$, $A*e^{jwt+\varphi 3}$, ..., and $A*e^{jwt+\varphi L}$ respectively represent answer signal data received by L antenna elements in each combination of antenna elements at a moment t, where A represents an amplitude of a signal received by the antenna element, $\varphi 1$, $\varphi 2$, $\varphi 3$, ..., and $\varphi L$ respectively represent phases of the L antenna elements in each combination of antenna elements, and w represents an intermediate frequency signal rate.

Operation b: Perform weighting on the combined data.

For example, when weighting is performed on the combined data, Q multi-beam filtering codebooks may be used to obtain an azimuth corresponding to each combination of antenna elements. A codebook corresponding to a fixed beam azimuth $\theta_i$ of a current combination of antenna elements is an L*1 vector. The codebook may be expressed as $B_{L*1}(t)=[e^{j\varphi 1}, e^{j\varphi 2}, e^{j\varphi 3}, \ldots, e^{j\varphi L}]$, which is a group of fixed constant coefficients. Q beam directions correspond to Q groups of codebook coefficients. Then, weighted combining is performed on signals obtained through codebook filtering to obtain $$C_{1*1}(t) = \sum_{i}^{L} X(i,t)B(i) = $$
$$e^{jwt+\varphi 1}*e^{j\varphi 1} + e^{jwt+\varphi 2}*e^{j\varphi 2} + e^{jwt+\varphi 3}*e^{j\varphi 3} + \ldots + e^{jwt+\varphi L}*e^{j\varphi L},$$

where $C_{1*1}(t)$ represents the weighted data that is performed by using a group of codebook coefficients.

Operation c: Obtain an azimuth corresponding to a combination of antenna elements based on the weighted data.

For example, after combination and weighting are performed on the signals received by the L receive channels, signal quality parameters may be calculated based on a value obtained through combination and weighting, and a codebook corresponding to a signal quality parameter with a maximum value is determined as the azimuth $\theta$ corresponding to the combination of antenna elements.

For example, the signal quality parameter is a received signal strength indication (RSSI). The RSSI is calculated based on a signal obtained through combination and weighting, where $RSSI(C)=\max(abs(C_{1*1}(t)))$. Q codebooks correspond to Q RSSI values. A codebook corresponding to a maximum RSSI value $C_{max}=\max(RSSI(C))=\max(\max(abs(C_{1*1}(t))))$ in the Q RSSI values is used as the corresponding azimuth $\theta$. A rectangular coordinate system Z of to-be-positioned space is set. An antenna array plane is an xoy plane. A direction of a spatial beam emitted by a combination of antenna elements is represented by $D_i$, and a beam direction measured and estimated for the combination of antenna elements is represented by $\hat{D}_i=f(x_i, y_i, \theta_i)$. A specific type of the signal quality parameter is not limited in this embodiment of this application. Herein, that the signal quality parameter is the RSSI is used as an example for description.

It may be understood that, when reception and sending are implemented by not sharing the local oscillator, an azimuth for each combination of antenna elements may be obtained by performing Operations a to c.

Operation d: Obtain a location of the tag based on azimuths corresponding to a plurality of combinations of antenna elements.

For example, there are R combinations of antenna elements. The processor may obtain, through Operations a to c, an azimuth corresponding to each combination of antenna elements. The R combinations of antenna elements correspond to R spatial beam directions. Origins for different combinations of antenna elements are different, and rays in beam angles of the R combinations of antenna elements intersect. A location at which lobes of the R combinations of antenna elements intersect is determined as a three-dimensional coordinate location D of the tag, where the location at which the lobes of the R combinations of antenna elements intersect is calculated based on the following formula: $\hat{D}=\hat{D}_1 \cap \hat{D}_2 \ldots \hat{D}_R = f(x_1, y_1, \theta_1) \cap f(x_2, y_2, \theta_2) \ldots \cap f(x_R, y_R, \theta_R)$. The location of the tag may be represented by coordinates in a relative coordinate system.

Figure 9:
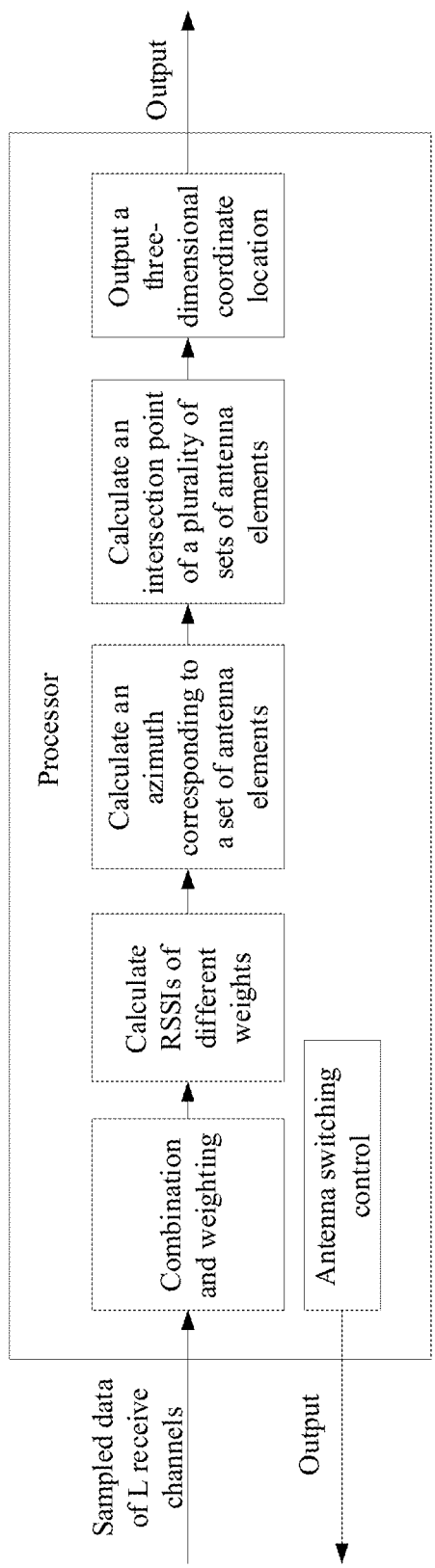
FIG. 9 is a schematic diagram of a structure of an azimuth calculation method according to an embodiment of this application.

With reference to FIG. 9, the following describes an azimuth calculation method provided in Operations a to d. As shown in FIG. 9, for the tag, if a device that sends a command to the tag and a device that receives an answer signal from the tag are a same device, that is, reception and sending are implemented by sharing the local oscillator, the processor performs combination and weighting on sampled data received by L receive channels, and calculates RSSIs of different weights, to obtain an azimuth corresponding to each combination of antenna elements. Then, a point at which lobes of a plurality of combinations of antenna elements intersect is calculated based on azimuths corresponding to the plurality of combinations of antenna elements. A location of the intersection point is determined as a location of the tag, and a three-dimensional coordinate location of the tag is output. It may be understood that, in this embodiment of this application, azimuth filtering can be implemented by performing, when tag position is performed, weighting on a signal obtained through combination. In addition, a phase shifter may be replaced by performing weighting processing on the signal obtained through combination. Therefore, the physical device, that is, the phase shifter, can be omitted, and costs are reduced.

Case 2: Reception and sending are implemented by sharing the local oscillator. For example, different combinations of antenna elements are switched at a time interval of $\Delta T$. A location of each antenna element in the antenna array is known. In this case, the processor may position the tag by performing the following four operations.

Operation e: Calculate $\Delta\varphi 1$ based on a frequency $\omega$ in the time interval of $\Delta T$.

Operation f: Calculate $\Delta\varphi 2$ based on data collected by the different combinations of antenna elements.

For example, $\Delta\varphi 2$ may be calculated according to the formula $\Delta\varphi 2=\varphi_{S11}-\varphi_{S12}$, where $\varphi_{S11}$ and $\varphi_{S12}$ respectively represent locations of the different combinations of antenna elements.

Operation g: Obtain an azimuth $\theta$ according to the formula $$\Delta\varphi 2 - \Delta\varphi 1 = \frac{2\pi^* d^* \sin\theta}{\lambda}.$$

d represents a spacing between any two adjacent rows in the antenna array or a spacing between any two adjacent columns in the antenna array, and the spacing d is greater than or equal to $\lambda/2$.

Operation h: Obtain a location of the tag based on azimuths corresponding to a plurality of combinations of antenna elements.

It may be understood that, for a specific embodiment of Operation h, refer to Operation d. Details are not described herein.

As shown in FIG. 9, in this embodiment of this application, the processor not only may be configured to position the tag, but also may output an antenna switching control signal. The antenna switching control signal is used to control the antenna selection circuit to select different combinations of antenna elements, to control switching of the different combinations of antenna elements. When the processor controls the antenna selection circuit to select different combinations of antenna elements, the following two switching manners may be used based on different degrees of sensitivity to positioning time consumption.

First switching manner: The processor controls, once every first duration in a time period in which the tag sends one answer signal, the antenna selection circuit to switch a combination of antenna elements.

A duration in which the tag sends one answer signal is a duration in which the tag sends one EPC frame. The processor may control, once every first duration in a time period in which the tag sends one EPC frame, the antenna selection circuit to switch a combination of antenna elements.

In embodiments, the processor may start timing from a time point at which an ACK command is sent. When the timing reaches a preset duration, the processor determines that the tag starts to send the EPC frame. Based on a time point at which the tag starts to send the EPC frame and the duration in which the tag sends the EPC frame, the processor may determine a time point at which the tag finishes sending the EPC frame. Starting from the time point at which the tag starts to send the EPC frame, the processor controls, once every first duration, the antenna selection circuit to switch a combination of antenna elements, until the tag finishes sending the EPC frame. The preset duration may be an empirical value, and the preset duration varies based on different application environments of the positioning apparatus. In other words, in this embodiment of this application, the processor may estimate, based on the empirical value, the time point at which the tag starts to send the EPC frame: and control, once every first duration in the time period in which the tag sends the EPC frame, the antenna selection circuit to switch a combination of antenna elements.

This switching manner is applicable to a scenario sensitive to positioning time consumption. In this switching manner, the positioning apparatus may sequentially send a select command, a query command, and an ACK command. When the reader sends the query command, the tag reports an RN16 frame in response to the query command. When the reader sends the ACK command, the tag reports an EPC frame in response to the ACK command. The EPC frame is a long frame, and the RN16 frame is a short frame. For example, a data amount of the EPC frame may be 128 bits, and a data amount of the RN16 frame may be 16 bits. In this switching manner, in response to the ACK command sent by the reader, the processor may control the antenna selection circuit to switch a combination of antenna elements once every first duration in the time period in which the tag sends one EPC frame.

In embodiments, the first duration is related to the duration in which the tag sends the answer signal and a quantity of different combinations of antenna elements included in the antenna array.

For example, the duration in which the tag sends the answer signal is the duration in which the tag sends the EPC frame. The duration in which the tag sends the EPC frame equals a total quantity of symbols multiplied by a quantity of periods per symbol divided by a symbol rate. According to a protocol definition, the following formula is met: Total quantity of symbols=12*Trext+4+preamble+16+epclen+crc. Trext represents a value in query signaling specified by the protocol, which may take a value of 1 or 0), preamble represents a preamble whose length is usually fixed to six symbols, crc represents a check code whose length is usually fixed to 16 symbols. The quantity of periods per symbol may be 1, 2, 4, or 8.

For example, the quantity of periods per symbol is 8. In this case, when the symbol rate is 40 kHz, the duration in which the tag sends the EPC frame is the longest. For example, an EPC length for a quantity of symbols in a tag ID indicates 96 symbols. The total quantity of symbols may be: 12+4+6+16+96+16=150. Therefore, the duration in which the tag sends the EPC frame is: 150*8/40=30 milliseconds. For another example, the quantity of periods per symbol is 1. In this case, when the symbol rate is 640 kHz, the duration in which the tag sends the EPC frame is the shortest. For example, the EPC length for the quantity of symbols in the tag ID indicates 96 symbols. The duration in which the tag sends the EPC frame is: 150*1/640-0.234375 millisecond.

For example, the quantity of different combinations of antenna elements included in the antenna array is related to a quantity of antenna elements in the antenna array. The quantity of different combinations of antenna elements included in the antenna array is a total quantity of different combinations that are of antenna elements and that can be formed by all antenna elements in the antenna array.

As shown in FIG. 7, for example, the antenna array includes a total of 4*4=16 antenna elements, and L equals 4. Any four antenna elements in the antenna array may form a combination of antenna elements, and the 16 antenna elements may be combined in a total of $C_4^1*C_4^1*C_4^1*C_4^1=256$ manners. Therefore, the quantity of different combinations of antenna elements included in the antenna array equals 256. For another example, as shown in FIG. 8, the antenna array includes a total of 2*4=8 antenna elements, and L equals 4. Any four antenna elements in the antenna array may form a combination of antenna elements, and the eight antenna elements may be combined in a total of $C_2^1*C_2^1*C_2^1*C_2^1=16$ manners. Therefore, the quantity of different combinations of antenna elements included in the antenna array equals 16.

For example, the quantity of different combinations of antenna elements included in the antenna array equals 16, and the duration in which the tag sends the EPC frame is 0.234375 millisecond. The first duration may be represented by $\Delta T$, where $\Delta T$=Duration in which the tag sends the EPC frame/Quantity of different combinations of antenna elements included in the antenna array-0.234375/16-0.0146484375 millisecond. To be specific, the processor may control, once every 0.0146484375 millisecond in the time period in which the tag sends one EPC frame, the antenna selection circuit to switch a combination of antenna elements.

In embodiments, when controlling the antenna selection circuit to switch different combinations of antenna elements, the processor may control, based on a preset rule, the antenna selection circuit to switch the different combinations of antenna elements. The preset rule may include but is not limited to: the processor controls the antenna selection circuit to sequentially traverse all combinations of antenna elements in the antenna array. Alternatively, the processor controls the antenna selection circuit to traverse each of a plurality of preset combinations of antenna elements. A quantity of the plurality of preset combinations of antenna elements is less than or equal to the quantity of different combinations of antenna elements included in the antenna array.

For example, the preset rule is: the processor controls the antenna selection circuit to sequentially traverse all combinations of antenna elements included in the antenna array. As shown in FIG. 7, the processor may control the antenna selection circuit to sequentially select a total of 256 combinations of antenna elements, such as antenna elements A to D in a first row, antenna elements A to D in a second row, antenna elements A to D in a third row, antenna elements A to D in a fourth row, antenna elements A to D in a first column, antenna elements A to D in a second column, antenna elements A to D in a third column, and antenna elements A to D in a fourth column, antenna elements A to D in an upper left corner, antenna elements A to D in an upper right corner, antenna elements A to D in a lower left corner, antenna elements A to D in a lower right corner, and antenna elements A to D in a center.

In embodiments, the duration in which the tag sends the EPC frame is limited. Therefore, if there are a large quantity of different combinations of antenna elements for the antenna array, only some of the different combinations of antenna elements may be switched in the time period in which the tag sends one EPC frame. In this case, the reader may send an ACK command again. In response to the ACK command, the tag reports an EPC frame again. The processor may control, once every first duration in a time period in which the tag reports the EPC frame again, the antenna selection circuit to switch a combination of antenna elements in remaining combinations of antenna elements.

In this switching manner, the answer signal is carried in the EPC frame.

It may be understood that, in the first switching manner, the tag reports the EPC frame in response to the ACK command sent by the reader. In the time period in which the tag reports one EPC frame, the processor may control the antenna selection circuit to switch a combination of antenna elements once every ΔT. If the tag finishes sending the EPC frame, some combinations of antenna elements are still not switched. In this case, the reader sends an ACK command again. In response to the ACK command that is sent again, the tag reports an EPC frame again. In a time period in which the tag sends the EPC frame again, the processor controls the antenna selection circuit to switch a combination of antenna elements once every ΔT in the combinations that are of antenna elements and that are not switched. In other words, in this switching manner, different combinations of antenna elements may be switched for a plurality of times in the time period in which the tag reports one EPC frame. Therefore, time for switching different combinations of antenna elements is short, and a positioning speed is fast. This switching manner is more applicable to a scenario sensitive to positioning time consumption.

Second switching manner: The processor is further configured to: send a plurality of query commands: and each time the query command is sent, control the antenna selection circuit to switch a combination of antenna elements.

The query command is the query command. Each time the processor sends the query command, the antenna selection circuit may be controlled to switch a combination of antenna elements.

This switching manner is applicable to a scenario insensitive to positioning time consumption. In this switching manner, the reader sequentially sends a select command and the query command. When the reader sends the query command, the tag reports an RN16 frame in response to the query command. In this switching manner, each time the reader sends the query command, the processor controls the antenna selection circuit to switch a combination of antenna elements. In response to the query command sent by the reader, the tag reports the RN16 frame.

In embodiments, the reader sends the select command to select a tag. Then, each time the reader sends the query command, the processor controls the antenna selection circuit to switch a combination of antenna elements. The processor may control, based on a preset rule, the antenna selection circuit to switch different combinations of antenna elements. The preset rule may include but is not limited to: the processor controls the antenna selection circuit to sequentially traverse all combinations of antenna elements in the antenna array. Alternatively, the processor controls the antenna selection circuit to traverse each of a plurality of preset combinations of antenna elements. A quantity of the plurality of preset combinations of antenna elements is less than or equal to the quantity of different combinations of antenna elements included in the antenna array.

For example, there are a total of 16 different combinations of antenna elements for the antenna array, and the reader sends the select command to select a tag. Then, each time the reader sends the query command, the processor controls the antenna selection circuit to select a group of antenna elements. The reader sequentially sends 16 query commands. Each time the query command is sent, the processor controls the antenna selection circuit to select a group of antenna elements. The processor may control the antenna selection circuit to select a total of 16 different combinations of antenna elements. It may be understood that the 16 query commands sent by the reader request to query a same tag.

For another example, there are 10 preset combinations of antenna elements. In this case, the reader sends a select command to select a tag. Then, each time the reader sends the query command, the processor controls the antenna selection circuit to select a group of antenna elements, where the selected group of antenna elements is any one of the 10 combinations of antenna elements. The reader sequentially sends 10 query commands. Each time the query command is sent, the processor controls the antenna selection circuit to select a group of antenna elements. The processor may control the antenna selection circuit to select a total of 10 different combinations of antenna elements.

In this switching manner, the answer signal is carried in the RN16 frame.

It may be understood that, in the second switching manner, a group of antenna elements is switched each time the query command is sent. Compared with the first switching manner in which different combinations of antenna elements are switched for a plurality of times in a time period in which the tag reports one EPC frame, time for switching a combination of antenna elements in this switching manner is longer. This switching manner is more applicable to a scenario insensitive to positioning time consumption. The first switching manner may be referred to as short-cycle switching due to short switching time, and the second switching manner may be referred to as long-cycle switching due to long switching time. The two different switching manners may be applicable to different scenarios due to different switching intervals.

It should be noted that, in Operations d and h in which the location of the tag is obtained based on azimuths corresponding to a plurality of combinations of antenna elements, selection may be performed on the plurality of combinations of antenna elements in the first or second witching manner based on different degrees of sensitivity to positioning time consumption.

In embodiments, the processor is further configured to: when a preset condition is met, stop switching a combination of antenna elements. The preset condition includes at least one of the following: a quantity of selected combinations of antenna elements reaches a preset quantity, where the preset quantity is less than or equal to the quantity of different combinations of antenna elements included in the antenna array: or a plurality of preset combinations of antenna elements are traversed in a process of switching different combinations of antenna elements.

It may be understood that in this embodiment of this application, the processor controls the antenna selection circuit to switch different combinations of antenna elements in the antenna array. This can reduce a quantity of receive channels in the positioning apparatus, and reduce complexity and costs. Alternatively, an azimuth corresponding to each combination of antenna elements may be obtained based on signals received by different combinations of antenna elements, and the location of the tag is accurately obtained based on the azimuths corresponding to the plurality of combinations of antenna elements.

The positioning apparatus provided in this embodiment of this application may be applied to the system shown in (a) in FIG. 4, or may be applied to the system shown in (b) in FIG. 4. The following describes structures and functions of the positioning apparatus in different systems.

As shown in FIG. 6 to FIG. 8, when the positioning apparatus is applied to the system shown in (a) in FIG. 4, the positioning apparatus is further configured to be coupled to a first antenna. An operating frequency of the first antenna differs from an operating frequency of an antenna element in an antenna array, and the positioning apparatus further includes a first transmitter circuit.

The processor is configured to send a first command to a repeater through the first transmitter circuit and the first antenna, where the repeater is configured to forward the first command. The first command is used to inventory or query a tag.

In embodiments, the first transmitter circuit is configured to send signaling to another device, where the first transmitter circuit and a first receiver circuit may operate in different modes. For example, an operating frequency band of the first transmitter circuit may differ from an operating frequency band of the first receiver circuit, and the first transmitter circuit is configured to send the first command to the repeater.

Signaling included in the first command varies based on different manners in which the processor switches different combinations of antenna elements. When the processor controls, once every first duration in a time period in which the tag sends an EPC frame, an antenna selection circuit to switch a combination of antenna elements, the first command includes a select command, a query command, and an ACK command. When the processor sends a plurality of query commands, the processor controls, each time the query command is sent, the antenna selection circuit to switch a combination of antenna elements. The first command includes a select command and a query command.

For example, the processor switches a combination of antenna elements in the foregoing first switching manner. With reference to (a) in FIG. 4, it can be learned that the positioning apparatus may sequentially send the select command, the query command, and the ACK command to the repeater through the first antenna. The repeater forwards, to the tag, the select command, the query command, and the ACK command that are sent by the reader. In response to commands forwarded by the repeater, the tag reports an answer signal (an EPC frame or an RN16 frame). In embodiments, the first antenna may be a single rod antenna.

It should be noted that, in the system shown in (a) in FIG. 4, for the tag, the repeater sends a command to the tag, and the reader receives an answer signal from the tag. Therefore, reception and sending are implemented by two devices. Therefore, in the system shown in (a) in FIG. 4, reception and sending are implemented by not sharing a local oscillator. The processor may perform Operations a to d to obtain an azimuth corresponding to each combination of antenna elements.

Figure 10B:
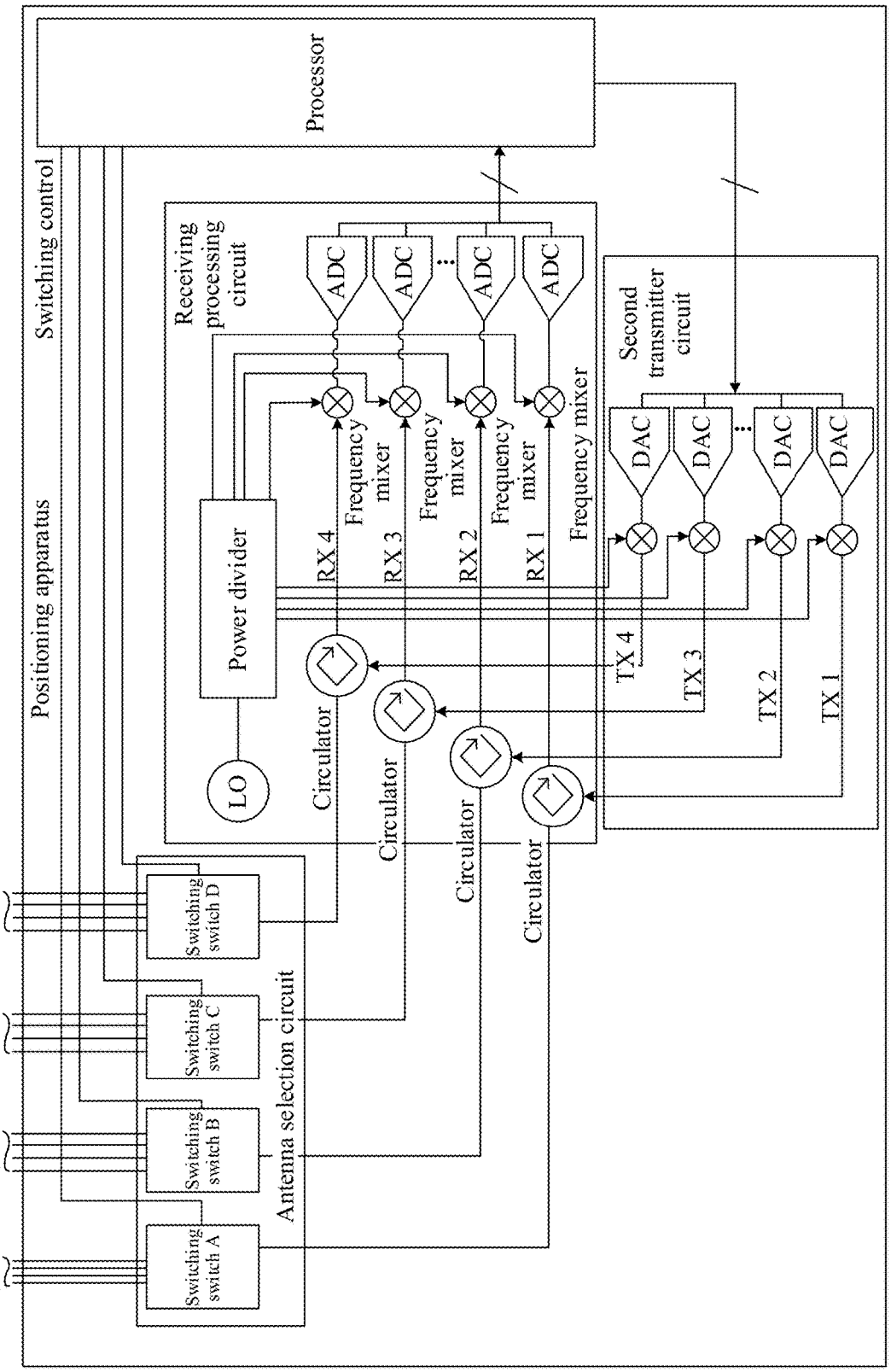

As shown in FIG. 10B, when the positioning apparatus is applied to the system shown in (b) in FIG. 4, each receiving processing subcircuit may further include a circulator, and the positioning apparatus further includes a second transmitter circuit. The antenna selection circuit is coupled to a frequency mixer in each receiving processing subcircuit and the second transmitter circuit through the circulator in each receiving processing subcircuit. The circulator is configured to implement receive/transmit combination.

The processor is further configured to send a first command through the second transmitter circuit, the circulator, and the antenna array.

The frequency mixer is specifically configured to perform, by using the circulator, down-conversion processing on an answer signal received by an antenna element corresponding to the frequency mixer.

Radio frequency cables from the antenna selection circuit to circulators in all receiving processing subcircuits have equal lengths. Radio frequency cables from the circulators to frequency mixers in all of the receiving processing subcircuits have equal lengths.

In embodiments, the second transmitter circuit is configured to send signaling to another device, where the second transmitter circuit and a first receiver circuit may operate in different modes. For example, an operating frequency band of the second transmitter circuit may differ from an operating frequency band of the first receiver circuit, and the second transmitter circuit is configured to send the first command to the tag.

In embodiments, as shown in FIG. 10B, the second transmitter circuit includes L transmitter subcircuits, and each transmitter subcircuit includes a digital-to-analog converter (DAC) and a frequency mixer. The LO in the receiving processing circuit is coupled to the frequency mixer in each transmitter subcircuit through a power divider.

For example, the processor switches a combination of antenna elements in the foregoing first switching manner. With reference to (b) in FIG. 4 and FIG. 10A and FIG. 10B, it can be learned that the positioning apparatus may send a select command, a query command, and an ACK command to the tag through the circulator and the antenna array, and receive an answer signal from the tag through the antenna array and the circulator. In other words, in the system shown in (b) in FIG. 4, for the tag, the reader sends a command to the tag, and the reader receives an answer signal from the tag. Therefore, reception and sending are implemented by one device. In addition, with reference to FIG. 10B, it can be learned that frequency mixing for receive channels (such as RX 1 to RX 4 in FIG. 10B) and transmit channels (such as TX 1 to TX 4 in FIG. 10B) in the positioning apparatus in the reader is performed based on a same LO. Therefore, reception and sending are implemented by sharing the local oscillator. Therefore, the processor may perform Operations e to h to obtain an azimuth corresponding to each combination of antenna elements.

With reference to (b) in FIG. 4, it can be learned that the positioning apparatus in the reader may send the first command directly to the tag. Therefore, in the system shown in (b) in FIG. 4, if the tag is a passive RFID tag, the reader may transmit a radio signal to the tag to charge the tag. In a case in which the tag shown in (b) in FIG. 4 is the passive RFID tag, signals may be transmitted always through a fixed channel if there are a plurality of receive channels in the positioning apparatus shown in FIG. 10A and FIG. 10B. In this way, when the processor switches different combinations of antenna elements, the passive RFID tag is not powered off, and a reception interruption does not occur. However, if there is one receive channel in the positioning apparatus shown in FIG. 10A and FIG. 10B, the passive RFID tag cannot receive the radio signal when different combinations of antenna elements are switched. Consequently, the passive RFID tag cannot send a signal, which results in a reception failure of the reader.

Figure 11:
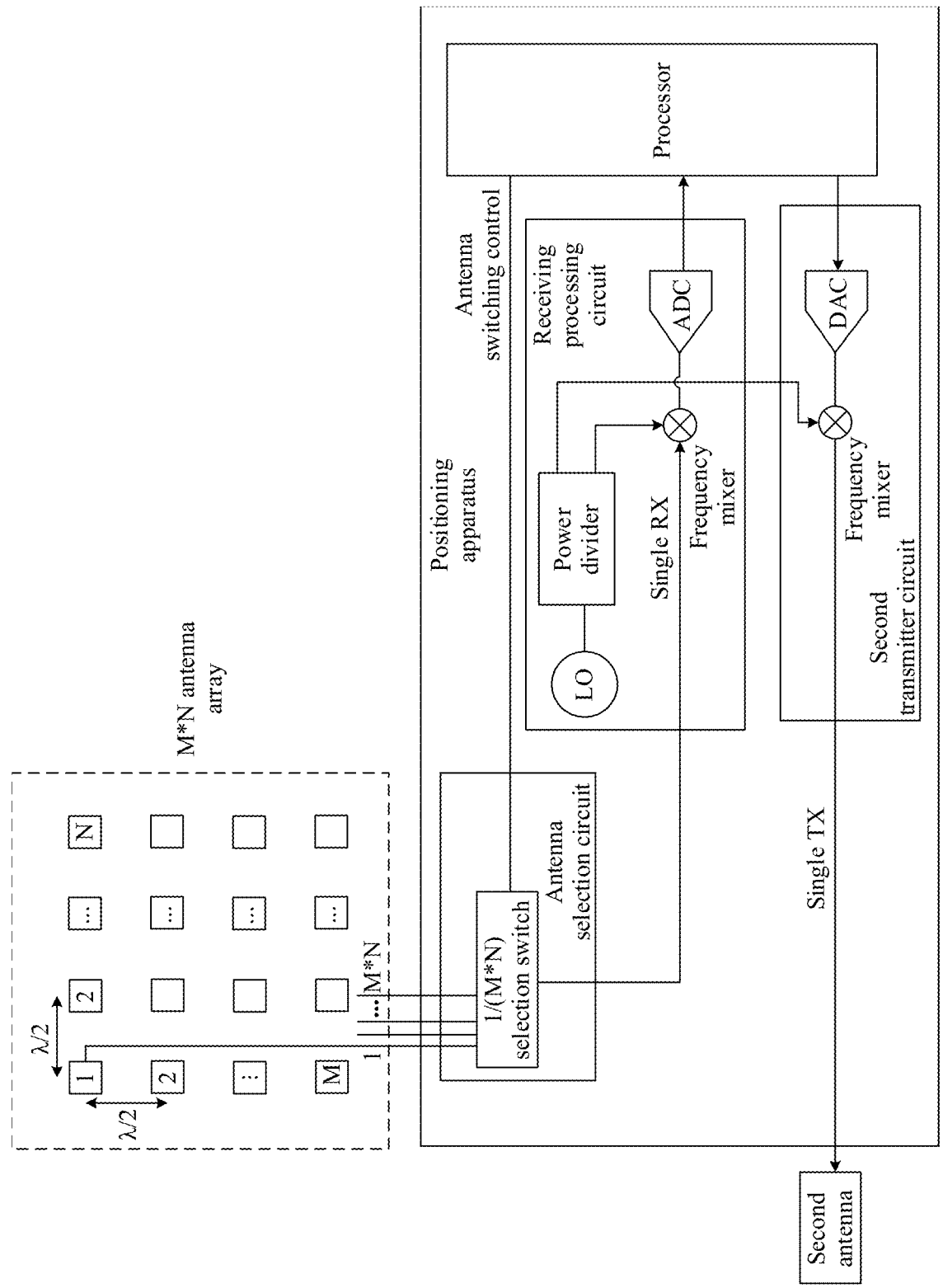
FIG. 11 is a schematic diagram of a structure of still yet another positioning apparatus according to an embodiment of this application.

To eliminate a reception failure that occurs if there is only one receive channel when the positioning apparatus shown in FIG. 10A and FIG. 10B positions the passive RFID tag, embodiments of this application further provide a positioning apparatus. As shown in FIG. 11, the positioning apparatus is further configured to be coupled to a second antenna. An operating frequency of the second antenna differs from an operating frequency of an antenna element in an antenna array.

A processor is further configured to send a first command through a second transmitter circuit and the second antenna.

As shown in FIG. 11, an antenna selection circuit includes a switching switch, where the switching switch is a 1/(M*N) selection switch. One end of the 1/(M*N) selection switch is configured to be coupled to each antenna element in the antenna array, and the other end of the 1/(M*N) selection switch is coupled to the processor through a receiving processing circuit. In the positioning apparatus shown in FIG. 11, there is only one switching switch. Therefore, there is only one receive channel.

Compared with the positioning apparatus shown in FIG. 10A and FIG. 10B, the positioning apparatus shown in FIG. 11 sends the first command to a tag through the second antenna: and switches, through the 1/(M*N) selection switch, different combinations of antenna elements to receive an answer signal from the tag. Therefore, the positioning apparatus shown in FIG. 11 implements reception and sending through different antenna elements, and uses different receive and transmit channels. Therefore, when the positioning apparatus shown in FIG. 11 is applied to the system shown in (b) in FIG. 4, if the tag is a passive RFID tag, the passive RFID tag may be charged by collecting wireless energy transmitted by the second antenna. In this case, when the positioning apparatus shown in FIG. 11 switches different antenna elements, sending is not affected, and a reception interruption does not occur.

It should be noted that, when the positioning apparatus shown in FIG. 11 is applied to the system shown in (b) in FIG. 4, the reader sends a command to the tag, and the reader receives the command from the tag. Therefore, reception and sending are implemented by one device. In addition, with reference to FIG. 11, it can be learned that frequency mixing for a receive channel (such as a single RX in FIG. 11) and a transmit channel (such as a single TX in FIG. 11) in the positioning apparatus in the reader is performed based on a same LO. Therefore, reception and sending are implemented by sharing the local oscillator. Therefore, the processor may perform Operations e to h to obtain an azimuth corresponding to each combination of antenna elements.

Figure 12:
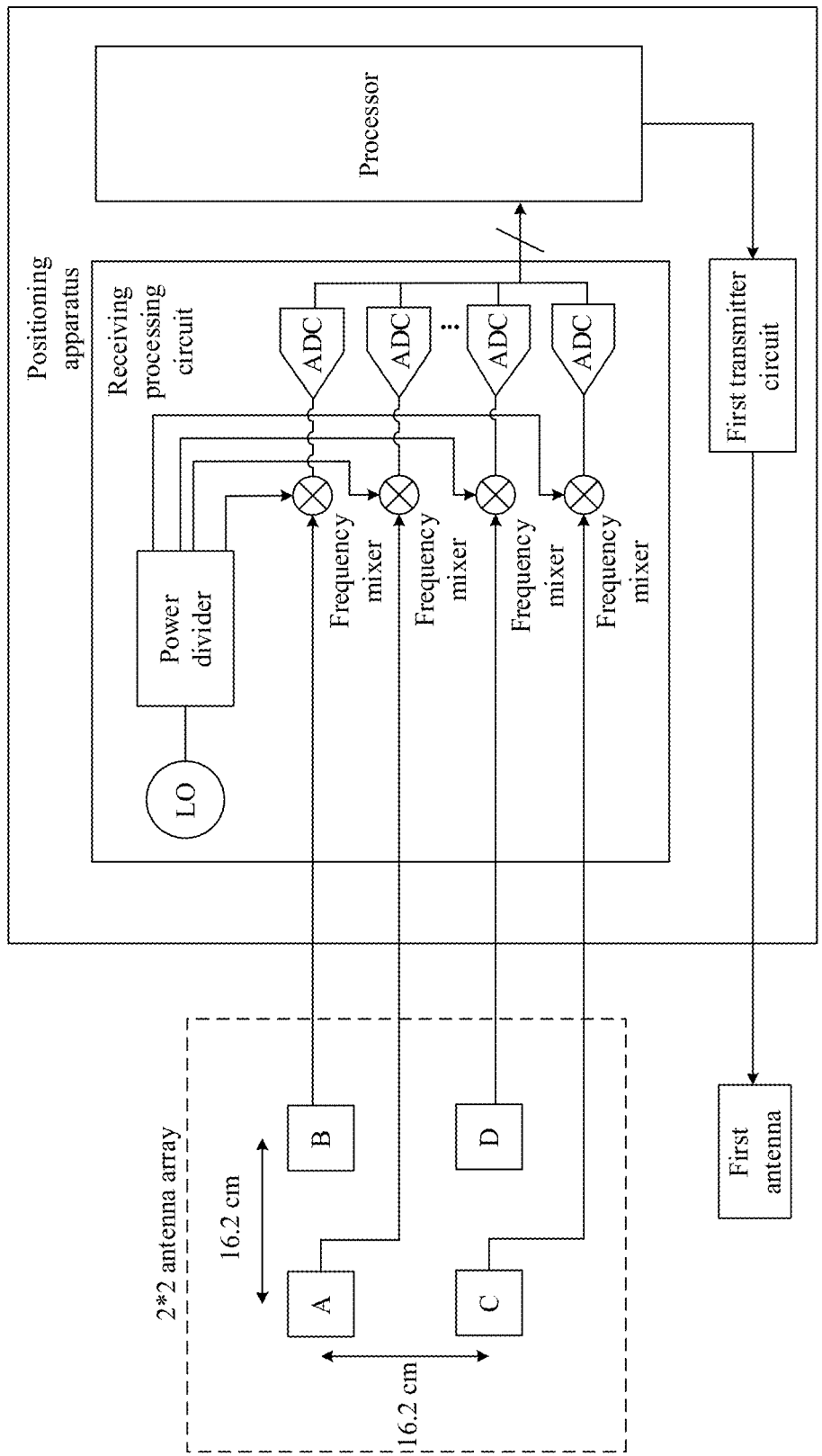
FIG. 12 is a schematic diagram of a structure of a further positioning apparatus according to an embodiment of this application.

An embodiment of this application further provides a positioning apparatus. As shown in FIG. 12, a quantity of receive channels in the positioning apparatus equals a quantity of antenna elements in an antenna array. The positioning apparatus includes a receiving processing circuit and a processor.

For example, the receiving processing circuit includes four receiving processing subcircuits, and the antenna array includes 2*2 antenna elements. As shown in FIG. 12, each receiving processing subcircuit is configured to be coupled to one antenna element in the antenna array. In this embodiment, the quantity of antenna elements equals the quantity of receive channels. Therefore, compared with the positioning apparatus shown in FIG. 6 to FIG. 8, the positioning apparatus in this embodiment omits the antenna selection circuit, and four receiving processing subcircuits each directly receive an answer signal from a tag through a response antenna element in the antenna array.

As shown in FIG. 12, the receiving processing circuit further includes a local oscillator and a power divider. Each receiving processing subcircuit includes a frequency mixer and an analog-to-digital converter. The frequency mixer in each receiving processing subcircuit is coupled to the processor through the analog-to-digital converter. The local oscillator is coupled to frequency mixers in the four receiving processing subcircuits through the power divider.

The frequency mixer is configured to perform, based on a radio frequency clock signal output by the local oscillator, down-conversion processing on an answer signal received by an antenna element corresponding to the frequency mixer.

The analog-to-digital converter is configured to perform analog-to-digital conversion on data obtained through down-conversion.

The processor is configured to obtain, based on data obtained through analog-to-digital conversion, an azimuth corresponding to a combination of antenna elements. In addition, the processor positions the tag based on azimuths corresponding to a plurality of combinations of antenna elements.

For specific functions of the foregoing frequency mixer, the analog-to-digital converter, and the processor, refer to related descriptions in the foregoing embodiment. Details are not described herein. Different from that in the foregoing embodiment, the processor in this embodiment does not send a switching control signal to switch different combinations of antenna elements. The receiving processing circuit directly receives signals through the antenna elements in the antenna array, and performs down-conversion and analog-to-digital conversion processing on signals received by the four receive channels. The processor positions the tag based on data obtained through analog-to-digital conversion.

It should be noted that, different from that in the foregoing embodiment, the quantity of receive channels in the embodiment shown in FIG. 12 equals the quantity of antenna elements in the antenna array. Therefore, no switching switch is needed to switch different combinations of antenna elements. Instead, the processor combines answer signals received by different receive channels to obtain different combinations of antenna elements, calculates an azimuth corresponding to each combination of antenna elements, and obtains a location of the tag based on azimuths corresponding to a plurality of combinations of antenna elements. In other words, in this embodiment, different antenna elements may be combined by using a software algorithm to obtain a plurality of combinations of antenna elements, to position the tag.

In embodiments, the positioning apparatus shown in FIG. 12 may further include a first transmitter circuit. The processor sends a first command to a repeater through the first transmitter circuit and the first antenna.

For example, the positioning apparatus shown in FIG. 12 is applied to the system shown in (a) in FIG. 4. In this case, with reference to (a) in FIG. 4, the positioning apparatus shown in FIG. 12 may send a select command, a query command, or an ACK command to the repeater through a single rod antenna. The repeater forwards, to the tag (the passive RFID tag in (a) in FIG. 4), the command sent by the reader. In response to the command sent by the repeater, the tag reports an answer signal (an EPC frame or an RN16 frame).

An embodiment of this application further provides a reader. As shown in FIG. 6, FIG. 7, FIG. 8, FIG. 10A and FIG. 10B, FIG. 11, or FIG. 12, the reader includes the foregoing positioning apparatus and antenna array. In embodiments, the reader may further include the foregoing first antenna or second antenna.

An embodiment of this application further provides a positioning system. The positioning system includes a repeater and a reader. As shown in FIG. 6, FIG. 7, FIG. 8, FIG. 10A and FIG. 10B, FIG. 11, or FIG. 12, the reader includes the foregoing positioning apparatus and antenna array. The reader is configured to send a first command to the repeater, where the first command includes at least one of a select select command, a query query command, or an acknowledgment ACK command. The repeater is configured to: receive the first command from the reader, and forward the first command to a tag. The tag is configured to send an answer signal to the reader. In embodiments, the positioning system further includes the tag.

In embodiments, signaling included in the first command varies based on different manners in which the processor switches different combinations of antenna elements. When the processor controls, once every first duration in a time period in which the tag sends an EPC frame, an antenna selection circuit to switch a combination of antenna elements, the first command includes the select command, the query command, and the ACK command. When the processor sends a plurality of query commands, the processor controls, each time the query command is sent, the antenna selection circuit to switch a combination of antenna elements. The first command includes a select command and a query command.

Figure 13:
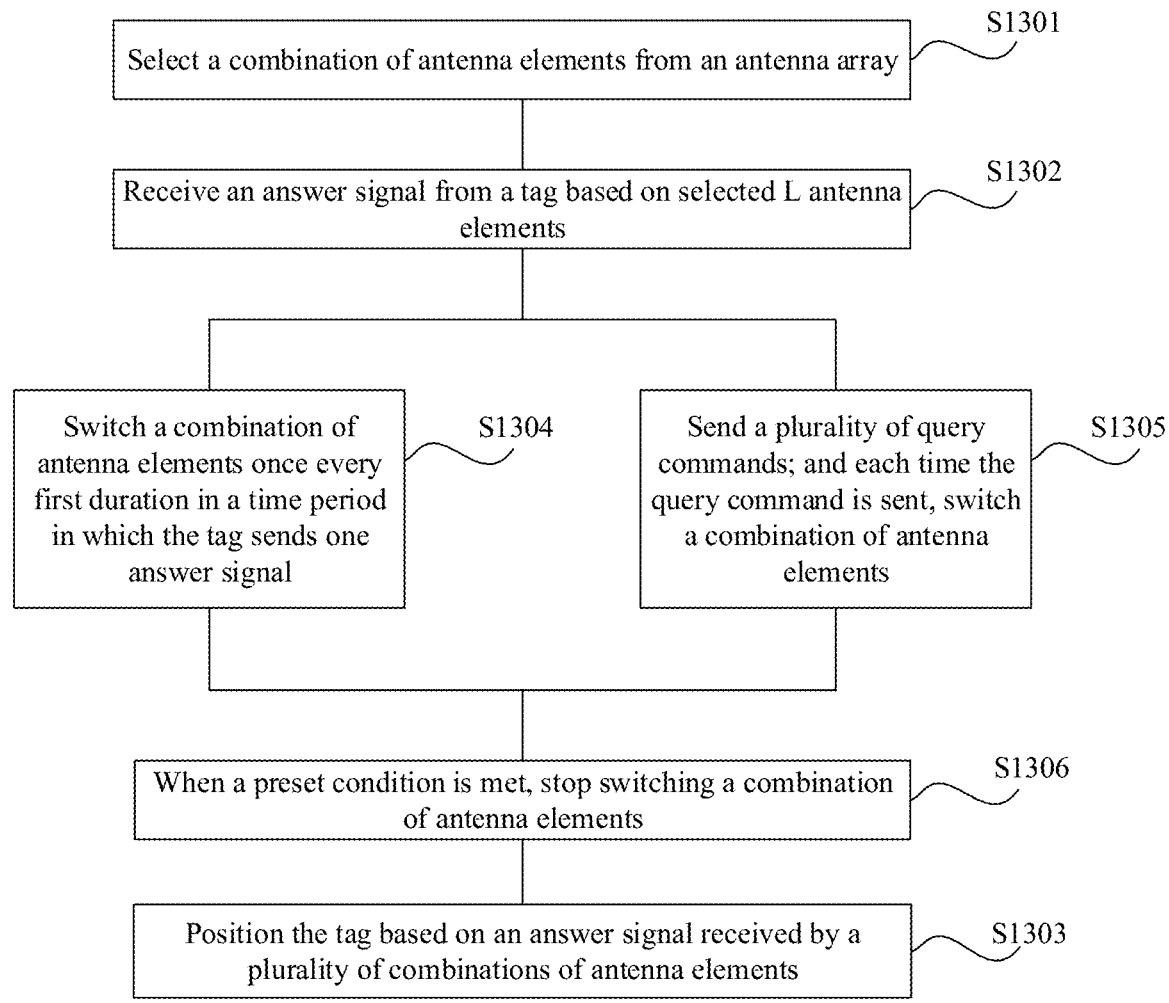
FIG. 13 is a schematic flowchart of a positioning method according to an embodiment of this application.

An embodiment of this application further provides a positioning method. The method may be performed by the processor shown in FIG. 6, FIG. 7, FIG. 8, FIG. 10A and FIG. 10B, FIG. 11, or FIG. 12. As shown in FIG. 13, the method includes the following operations.

S1301: Select a combination of antenna elements from an antenna array.

The antenna array includes M*N antenna elements, where M and N are integers greater than or equal to 1. In addition. M and N do not both equal 1. Each combination of antenna elements includes L antenna elements, where L is a positive integer less than M*N.

In embodiments, the M*N antenna elements included in the antenna array are arranged in M rows and N columns, and a spacing between any two adjacent rows in the antenna array equals a spacing between any two adjacent columns in the antenna array. The spacing may be greater than or equal to 0.5 times a wavelength.

For example, that the processor selects a combination of antenna elements from the antenna array may include: the processor outputs an antenna switching control signal. The antenna switching control signal is used to select a combination of antenna elements from the antenna array. An antenna selection circuit may select a combination of antenna elements from the antenna array based on the antenna switching control signal output by the processor.

S1302: Receive an answer signal from a tag based on selected L antenna elements.

The tag may be any one of a plurality of tags. For example, a reader sends a select command, where the select command carries EPC information of the tag, and the select command may be used to select the tag from the plurality of tags.

S1303: Position the tag based on an answer signal received by a plurality of combinations of antenna elements.

In embodiments, when the processor positions the tag based on the answer signal, the answer signal may be data processed by the receiving processing circuit shown in FIG. 6, FIG. 7, FIG. 8, FIG. 10A and FIG. 10B, FIG. 11, or FIG. 12.

In embodiments, for the tag, a device that sends a command to the tag and a device that receives an answer signal from the tag may be a same device or may be different devices. When the device that sends a command to the tag and the device that receives an answer signal from the tag are the same device, reception and sending may be implemented by sharing a local oscillator. When the device that sends a command to the tag and the device that receives an answer signal from the tag are different devices, reception and sending are implemented by not sharing the local oscillator. Therefore, the tag may be positioned in the following two cases based on whether reception and sending are implemented by sharing the local oscillator.

Case 1: Reception and sending are implemented by not sharing the local oscillator. In this case, in Operation S1303, the tag may be positioned by performing Operations a to d.

It should be noted that, when the positioning apparatus shown in FIG. 6, FIG. 7, FIG. 8, or FIG. 12 is applied to the system architecture shown in (a) in FIG. 4, reception and sending are implemented by not sharing the local oscillator. In this case, a location of the tag may be obtained by using an azimuth calculation method provided in Operations a to d.

Case 2: Reception and sending are implemented by sharing the local oscillator. For example, a combination of antenna elements is switched once every $\Delta T$. A location of each antenna element in the antenna array is known. In this case, in Operation S1303, the tag may be positioned by performing Operations e to h.

It should be noted that, when the positioning apparatus shown in FIG. 10A and FIG. 10B or in FIG. 11 is applied to the system architecture shown in (b) in FIG. 4, reception and sending are implemented by sharing the local oscillator. In this case, a location of the tag may be obtained by using an azimuth calculation method provided in Operations e to h.

It may be understood that, for details about how to obtain the location of the tag in Operation S1303, refer to related descriptions in the foregoing embodiment. Details are not described herein.

In embodiments, the plurality of combinations of antenna elements in Operation S1303 may be obtained in a switching manner of S1304 or S1305.

S1304: Switch a combination of antenna elements once every first duration in a time period in which the tag sends one answer signal.

The first duration is related to a duration in which the tag sends the answer signal and a quantity of different combinations of antenna elements included in the antenna array. For a specific calculation method of the first duration and related descriptions of the quantity of different combinations of antenna elements included in the antenna array, refer to the foregoing embodiment. Details are not described.

The duration in which the tag sends the answer signal is a duration in which the tag sends an EPC frame.

In embodiments, the duration in which the tag sends the EPC frame is limited. Therefore, if there are a large quantity of different combinations of antenna elements for the antenna array, only some of the different combinations of antenna elements may be switched in a time period in which the tag sends one EPC frame. In this case, the reader may send an ACK command again. In response to the ACK command, the tag reports the EPC frame again. In a time period in which the tag reports the EPC frame again, the processor switches a combination of antenna elements in remaining combinations of antenna elements once every first duration.

In an embodiment of Operation S1304, different combinations of antenna elements may be switched for a plurality of times in the time period in which the tag reports one EPC frame. Therefore, time for switching different combinations of antenna elements is short, and a positioning speed is fast. This embodiment is more applicable to a scenario sensitive to positioning time consumption.

An execution sequence of Operations S1303 and S1304 is not limited in this embodiment of this application. For example, the processor may calculate the location of the tag once each time a combination of antenna elements is switched, or may calculate the location of the tag once when a plurality of combinations of antenna elements are switched. FIG. 13 shows an example of calculating the location of the tag once when a plurality of combinations of antenna elements are switched.

S1305: Send a plurality of query commands: and each time the query command is sent, switch a combination of antenna elements.

For example, the reader sends a select command to select the tag. Then, each time the reader sends the query command, the processor switches a combination of antenna elements. The processor may switch different combinations of antenna elements based on a preset rule. The preset rule may include but is not limited to: the processor sequentially traverses each combination of antenna elements in the antenna array. Alternatively, the processor traverses each combination of antenna elements in a plurality of different preset combinations of antenna elements. A quantity of the plurality of different preset combinations of antenna elements is less than or equal to the quantity of different combinations of antenna elements included in the antenna array.

In an embodiment of Operation S1305, a combination of antenna elements is switched each time the query command is sent. Compared with the embodiment in Operation S1304 in which different combinations of antenna elements are switched for a plurality of times in a time period in which the tag reports one EPC frame, time for switching a combination of antenna elements in this embodiment is longer. This embodiment is more applicable to a scenario insensitive to positioning time consumption.

An execution sequence of Operations S1303 and S1305 is not limited in this embodiment of this application. For example, the processor may calculate the location of the tag once each time a combination of antenna elements is switched, or may calculate the location of the tag once when a plurality of combinations of antenna elements are switched. FIG. 13 shows the example of calculating the location of the tag once when a plurality of combinations of antenna elements are switched.

In embodiments, after Operation S1304 or S1305 is performed. Operation S1306 may be further performed.

S1306: When a preset condition is met, stop switching a combination of antenna elements.

For example, the preset condition includes at least one of the following: a quantity of selected combinations of antenna elements reaches a preset quantity, where the preset quantity is less than or equal to the quantity of different combinations of antenna elements included in the antenna array; or a plurality of preset combinations of antenna elements are traversed in a process of switching different combinations of antenna elements. The preset condition for stopping switching a combination of antenna elements is not limited in this embodiment of this application, and is merely an example for description herein.

According to the positioning method provided in this embodiment of this application, different combinations of antenna elements are selected from the antenna array, which can reduce a quantity of receive channels. In addition, this reduces complexity and has low costs. In addition, a phase shifter may be replaced by performing weighting on an answer signal from the tag when the location of the tag is calculated. Therefore, the phase shifter is omitted when tag positioning is performed, and costs can be reduced.

An embodiment of this application further provides a positioning device. The positioning device includes a processor and a memory. The memory is configured to store a computer program, and the processor is configured to execute the computer program, so that the positioning device implements the method shown in FIG. 13.

An embodiment of this application further provides a computer-readable storage medium. The computer-readable storage medium includes computer program code. When the computer program code is run on a processor, the processor is enabled to perform the method shown in FIG. 13.

An embodiment of this application further provides a computer program product. The computer program product includes program instructions. When the program instructions are executed, the method shown in FIG. 13 is implemented.

Method or algorithm operations described in combination with the content disclosed in this application may be implemented by hardware, or may be implemented by a processor by executing software instructions. The software instructions may be formed by a corresponding software module. The software module may be stored in a random access memory (RAM), a flash memory, an erasable programmable read-only memory (EPROM), an electrically erasable programmable read-only memory (EEPROM), a register, a hard disk, a removable hard disk, a compact disc read-only memory (CD-ROM), or a storage medium in any other form well-known in the art. For example, a storage medium is coupled to a processor, so that the processor can read information from the storage medium and write information into the storage medium. Certainly, the storage medium may be a component of the processor. The processor and the storage medium may be located in an ASIC. In addition, the ASIC may be located in a core network interface device. Certainly, the processor and the storage medium may exist in the core network interface device as discrete components.

A person skilled in the art should be aware that in the foregoing one or more examples, functions described in the present invention may be implemented by using hardware, software, firmware, or any combination thereof. When the functions are implemented by software, the foregoing functions may be stored in a computer-readable medium or transmitted as one or more instructions or code in a computer-readable medium. The computer-readable medium includes a computer storage medium and a communication medium, and the communication medium includes any medium that enables a computer program to be transmitted from one place to another. The storage medium may be any available medium accessible to a general-purpose or a dedicated computer.

The objectives, technical solutions, and beneficial effects of the present invention are further described in detail in the foregoing specific embodiments. It should be understood that the foregoing descriptions are merely specific embodiments of the present invention, but are not intended to limit the protection scope of the present invention. Any modification, equivalent replacement, or improvement made based on the technical solutions of the present invention shall fall within the protection scope of the present invention.

What is claimed is:

1. A positioning apparatus, comprising:
    a receiving processing circuit;
    a processor;
    an antenna selection circuit, coupled to the processor through the receiving processing circuit, wherein the antenna selection circuit is configured to be coupled to an antenna array, the antenna array comprises M*N antenna elements, M and N are integers greater than or equal to 1, and M and N do not both equal 1;
    the antenna selection circuit is configured to select different combinations of antenna elements from the antenna array, each combination of antenna elements comprises L antenna elements, and L is a positive integer less than or equal to M*N;
    the processor is configured to control the antenna selection circuit to select a combination of antenna elements from the antenna array;
    the receiving processing circuit is configured to: receive an answer signal from a tag through L antenna elements selected by the antenna selection circuit, and process the answer signal; and
    the processor is further configured to position the tag based on data processed by the receiving processing circuit.

2. The positioning apparatus according to claim 1, wherein the antenna selection circuit comprises L switching switches, one end of each switching switch is configured to be coupled to K antenna elements in the antenna array, K is a positive integer less than or equal to M*N/L, and an other end of each switching switch is coupled to the receiving processing circuit; and
    the processor is specifically configured to control the L switching switches to select L antenna elements from the antenna array.

3. The positioning apparatus according to claim 2, wherein the K antenna elements coupled to each switching switch are respectively located in different columns of the antenna array; the K antenna elements coupled to each switching switch are respectively located in different rows of the antenna array; or the K antenna elements coupled to each switching switch are respectively located in different rows and different columns of the antenna array.

4. The positioning apparatus according to claim 1, wherein the processor is specifically configured to control, once every first duration in a time period in which the tag sends one answer signal, the antenna selection circuit to switch a combination of antenna elements.

5. The positioning apparatus according to claim 4, wherein the first duration is related to a duration in which the tag sends the answer signal and a quantity of different combinations of antenna elements comprised in the antenna array.

6. The positioning apparatus according to claim 1, wherein the processor is further configured to: send a plurality of query commands; and each time the query command is sent, control the antenna selection circuit to switch a combination of antenna elements once, wherein the query command is used to query the tag.

7. The positioning apparatus according to claim 4, wherein the processor is further configured to:
    when a preset condition is met, stop switching a combination of antenna elements, wherein the preset condition comprises at least one of the following:
        a quantity of selected combinations of antenna elements reaches a preset quantity, wherein the preset quantity is less than or equal to a quantity of different combinations of antenna elements comprised in the antenna array; or
        a plurality of preset combinations of antenna elements are traversed in a process of switching different combinations of antenna elements.

8. The positioning apparatus according to claim 1, wherein the receiving processing circuit comprises L receiving processing subcircuits, and the processor is specifically configured to:
    combine data processed by each of the L receiving processing subcircuits;
    perform weighting on the combined data;
    obtain, based on the weighted data, an azimuth corresponding to a combination of antenna elements; and
    position the tag based on azimuths corresponding to a plurality of combinations of antenna elements.

9. The positioning apparatus according to claim 1, wherein the receiving processing circuit comprises L receiving processing subcircuits, each receiving processing subcircuit comprises a frequency mixer and an analog-to-digital converter, and the frequency mixer in each receiving processing subcircuit is coupled to the processor through the analog-to-digital converter;
    the frequency mixer is configured to perform down-conversion processing on the answer signal received by an antenna element corresponding to the frequency mixer;
    the analog-to-digital converter is configured to convert, into a digital signal, the down-converted answer signal; and
    the processor is configured to obtain a location of the tag based on data processed by the analog-to-digital converter.

10. The positioning apparatus according to claim 9, wherein the receiving processing circuit further comprises a local oscillator and a power divider, and the local oscillator is coupled to the frequency mixer in each of the L receiving processing subcircuits through the power divider;

the local oscillator is configured to provide a radio frequency clock for up-conversion or down-conversion; and the frequency mixer is configured to perform, based on a radio frequency clock signal output by the local oscillator, the down-conversion processing on the answer signal received by the antenna element corresponding to the frequency mixer.

11. The positioning apparatus according to claim 10, wherein radio frequency cables from the antenna selection circuit to frequency mixers in the receiving processing subcircuits have equal lengths, and signal traces from the power divider to the frequency mixers in the receiving processing subcircuits have equal lengths.

12. The positioning apparatus according to claim 1, wherein the positioning apparatus is further configured to be coupled to a first antenna, an operating frequency of the first antenna differs from an operating frequency of an antenna element, and the positioning apparatus further comprises a first transmitter circuit; and the processor is further configured to send a first command to a repeater through the first transmitter circuit and the first antenna, wherein the first command is used to inventory or query the tag.

13. The positioning apparatus according to claim 1, wherein the positioning apparatus further comprises a second transmitter circuit, the receiving processing circuit comprises L receiving processing subcircuits, each receiving processing subcircuit further comprises a circulator, the antenna selection circuit is coupled to a frequency mixer in each receiving processing subcircuit and the second transmitter circuit through the circulator in the receiving processing subcircuit, and the circulator is configured to implement receive/transmit combination;

the processor is further configured to send a first command through the second transmitter circuit, the circulator, and the antenna array; and the frequency mixer is configured to perform, by using the circulator, down-conversion processing on the answer signal received by an antenna element corresponding to the frequency mixer.

14. The positioning apparatus according to claim 1, wherein the positioning apparatus and the antenna array are comprised in a reader device.

15. The positioning apparatus according to claim 1, wherein the positioning apparatus and the antenna array are comprised in a reader device configured to send a first command to a repeater, wherein the first command is used to inventory or query the tag;

the repeater is configured to: receive the first command from the reader device, and forward the first command to a tag; and the tag is configured to send an answer signal to the reader device.

16. A positioning method, comprising:
selecting a combination of antenna elements from an antenna array, wherein the antenna array comprises M*N antenna elements, M and N are integers greater than or equal to 1, M and N do not both equal 1, and each combination of antenna elements comprises L antenna elements, wherein L is a positive integer less than M*N;
receiving an answer signal from a tag based on selected L antenna elements; and
positioning the tag based on the answer signal.

17. The method according to claim 16, wherein the method further comprises:
switching a combination of antenna elements once every first duration in a time period in which the tag sends one answer signal.

18. The method according to claim 16, wherein the method further comprises:
sending a plurality of query commands; and each time the query command is sent, switching a combination of antenna elements once, wherein the query command is used to query the tag.

19. A positioning device, wherein the positioning device comprises a processor and a memory, the memory is configured to store a computer program, and the processor is configured to execute the computer program, causing the positioning device to perform operations, comprising:
selecting a combination of antenna elements from an antenna array, wherein the antenna array comprises M*N antenna elements, M and N are integers greater than or equal to 1, M and N do not both equal 1, and each combination of antenna elements comprises L antenna elements, wherein L is a positive integer less than M*N;
receiving an answer signal from a tag based on selected L antenna elements; and
positioning the tag based on the answer signal.

20. A computer-readable storage medium, wherein the computer-readable storage medium comprises computer program code; and when the computer program code is run on a processor, the processor is enabled to perform operations comprising:
selecting a combination of antenna elements from an antenna array, wherein the antenna array comprises M*N antenna elements, M and N are integers greater than or equal to 1, M and N do not both equal 1, and each combination of antenna elements comprises L antenna elements, wherein L is a positive integer less than M*N;
receiving an answer signal from a tag based on selected L antenna elements; and
positioning the tag based on the answer signal.

* * * * *